(12) United States Patent
Alexander et al.

(10) Patent No.: US 6,754,741 B2
(45) Date of Patent: Jun. 22, 2004

(54) FLEXIBLE FIFO SYSTEM FOR INTERFACING BETWEEN DATAPATHS OF VARIABLE LENGTH

(75) Inventors: Thomas Alexander, Mulino, OR (US); David Wong, Vancouver (CA)

(73) Assignee: PMC-Sierra, Inc. (CA)

( * ) Notice: Subject to any disclaimer, the term of this patent is extended or adjusted under 35 U.S.C. 154(b) by 348 days.

(21) Appl. No.: 09/854,075

(22) Filed: May 10, 2001

(65) Prior Publication Data

US 2003/0037190 A1 Feb. 20, 2003

(51) Int. Cl.[7] ............... G06F 13/00; G06F 13/14
(52) U.S. Cl. ............... 710/52; 710/33; 710/35; 710/54; 710/56
(58) Field of Search .................. 710/33, 35, 52, 710/54, 56

(56) References Cited

U.S. PATENT DOCUMENTS

| | | | |
|---|---|---|---|
| 3,686,640 A | 8/1972 | Andersen et al. | |
| 3,800,289 A | 3/1974 | Batcher | |
| 3,812,467 A | 5/1974 | Batcher | |
| 4,747,070 A | 5/1988 | Trottier et al. | |
| 5,008,852 A | 4/1991 | Mizoguchi | |
| 5,111,389 A | 5/1992 | McAuliffe et al. | |
| 5,807,245 A * | 9/1998 | Aldestam et al. | 600/300 |
| 6,091,707 A * | 7/2000 | Egbert et al. | 370/229 |
| 6,092,128 A * | 7/2000 | Maas et al. | 710/57 |
| 6,226,338 B1 * | 5/2001 | Earnest | 375/372 |
| 6,311,161 B1 * | 10/2001 | Anderson et al. | 704/500 |
| 6,333,935 B1 * | 12/2001 | Carr et al. | 370/442 |
| 6,490,324 B1 * | 12/2002 | McDade et al. | 375/240.25 |

* cited by examiner

*Primary Examiner*—Rehana Perveen
(74) *Attorney, Agent, or Firm*—Townsend and Townsend and Crew LLP; Kenneth R. Allen

(57) ABSTRACT

A FIFO buffer arrangement is disclosed that is capable of buffering and transferring data between multiple input and output datapaths of varying widths. All of the input and output buses may be used to transfer data concurrently. Data that are written to the FIFO via any of the input buses may be extracted from the FIFO via any of the output buses. The FIFO efficiently carries out all necessary width conversions when performing the data transfers.

42 Claims, 9 Drawing Sheets

FLEXIBLE FIFO SYSTEM FOR INTERFACING BETWEEN DATAPATHS OF VARIABLE LENGTH

CROSS REFERENCE TO RELATED APPLICATIONS

This application is related to co-pending and co-owned U.S. application Ser. No. 09/812,821, entitled "Multi-Stream Merge Network For Data Width Conversion and Multiplexing," filed Mar. 21, 2001 and is herein incorporated by reference for all purposes.

BACKGROUND OF THE INVENTION

The present invention is generally related to memory storage techniques and more particularly to a logical FIFO storage method and apparatus.

Physical layer devices frequently involve complex FIFO buffering requirements. Such buffers may have to support multiple channels of data, with different bandwidths and physical datapath widths. The number of channels may be different on the input and output sides of the FIFO, and may further have to be configurable depending on the application of the device. For efficiency, it may be desirable to use a single block of RAM—e.g., when the number of channels can vary between wide limits—and create multiple logical FIFOs within this RAM. Finally, the FIFOs may have to run at high speeds (10 Gb/s or more) to support the requirements of the physical layer interfaces.

Several different ways have been employed in the past to solve the data width conversion and merging problems in various applications, usually at lower data rates. Considered below are some approaches to solving this problem.

The most obvious means of solving the problem is to use a data RAM of width equal to the highest common factor among all the different datapath widths that are to be supported. For example, if the various FIFO interface widths required are 8, 16, 32 and 128 bits, an 8-bit-wide RAM would be used. The wider datapath widths would be supported via multiplexing and demultiplexing logic. This "brute-force" approach is commonly used when data rates are low. It is, however, not feasible when the speeds increase. For example, supporting a 10 Gb/s data rate for the above combination of widths would require an 8-bit RAM capable of operating at 1.25 GHz. Such RAMs are very difficult to obtain using present CMOS technology. In addition, the solution is not scalable—a 40 Gb/s data rate requires a 5 GHz RAM, which is not possible at all in the near future.

Another possibility is to use several RAMs to construct the FIFO. Each FIFO would have a width corresponding to a particular datapath width. Circuitry would be provided to select the appropriate RAM based on the current configuration. This approach, however, is significantly more resource-intensive than using a single RAM. It is less efficient as well because most of the RAMs would not be used at any given time. In addition, it does not solve the issue of different input and output widths.

Other approaches using shift register networks on the input and output sides of the RAM have also been proposed and implemented. These architectures are relatively flexible. Typically, multi-stage shifting networks are used to shift and align incoming data from narrower streams to various positions in a wider stream. The wider stream feeds into a multiplexer, register, and buffer logic to merge the various narrow data words together into the desired wide output. The reverse operation is used on the output side. However, this approach suffers from the difficulty that its complexity grows by $N^2$, where N is the number of channels to be supported. Thus, if the number of channels is large (e.g., 64), the resulting shift register network becomes enormous. In addition, these approaches are difficult to deal with at high speeds and/or large data widths due to the large number of interconnections. A 40 Gb/s FIFO supporting 64 datapath channels of 8 bits each, using typical 160 MHz RAMs, would require 16,384 register bits and 32,768 crossing wires, which is quite expensive to implement. Higher numbers would reach the limits of design rules in the circuit layout of the integrated circuit device. Attempting to support configurable channelizations (e.g., 1 channel of 256 bits, 16 channels of 32 bits each, or 64 channels of 8 bits each, or some combination of these) vastly complicates the problem.

Yet another general approach is to split up the RAM into a number of fixed-width, fixed-size units. A striping or interleaving scheme is then applied to distribute data across logical FIFOs built within the RAM. The striping is done to eliminate conflicts and wasted bandwidth that would otherwise occur due to the differences between the widths of the data ports and the width of the RAM. However, the use of such mechanisms results in very complex data steering, addressing and buffer management logic, and thus are not easily extensible to higher data rates.

The apparatus described in U.S. Pat. Nos. 3,812,467 and 3,800,289 hint at a possible solution to the above problem. The patents detail a multi-stage network used in conjunction with a memory and addressing scheme to transform a CPU's view of a single block of memory from a bit-wise organization to a word-wise organization, or vice-versa. Multi-stage networks are well known as having very desirable properties from a space and speed standpoint, especially when scaled up to large dimensions. The specific multi-dimensional memory addressed by the referenced patents, however, is not suitable for our purposes, because it does not support the concept of multiple independent streams being directed into and out of multiple logical buffers within a single physical memory, possibly with different widths on the input and output sides. In addition, the memory requires the use of $2^n$ individual memory modules and a complex addressing and module selection scheme, which is undesirable from the perspective of implementation convenience and efficiency.

There is a need for a FIFO approach which exhibits high efficiency usage and high utilization capability. The FIFO mechanism and method should be regular and simple. The FIFO must be able to receive variable-sized input streams and output to variable-sized output streams.

SUMMARY OF THE INVENTION

In accordance with an embodiment of the invention, a FIFO storage method includes receiving one or more data streams at an input. Internal data comprising combinations of the incoming data are produced and stored in a memory store. Internal data obtained from a data stream are stored in and accessed from the memory store in first-in-first-out (FIFO) fashion. Internal data accessed from the memory store are processed to produce outgoing data. Each output datum comprises one or more of the constituent incoming data which constitute the accessed internal data.

In accordance with another embodiment of the invention, an incoming data stream is stored in a memory store in FIFO order. The data are read out of the memory store in FIFO order. Outgoing data are produced and output on one or more output ports. Each outgoing datum comprises a combination of one or more data read from the memory store.

In accordance with yet another embodiment of the invention, plural incoming data streams are processed to produce internal words. Each internal word comprises one or more data read in from one of the incoming data streams. Each internal word is stored in a memory store and is associated with a logical FIFO. The internal words are read out of the memory store and output on an output port.

The remainder of this document sets forth a description of an embodiment of the present invention.

BRIEF DESCRIPTION OF THE DRAWINGS

The teachings of the present invention can be readily understood by considering the following detailed description of illustrative examples of embodiments of the invention, in conjunction with the accompanying drawings.

DESCRIPTION OF THE SPECIFIC EMBODIMENTS

Figure 1:
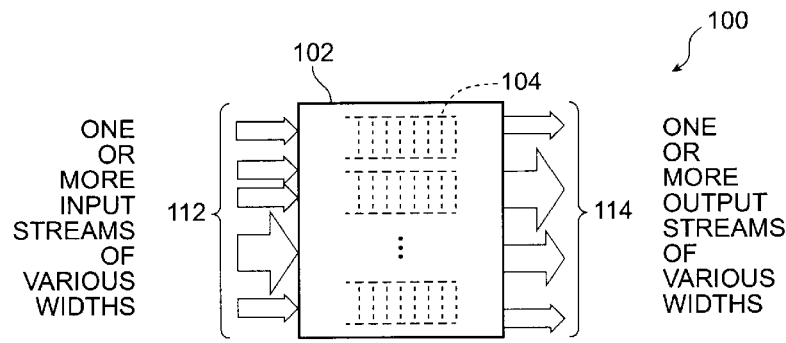
FIG. 1 shows a simplified high level representation of an embodiment of the FIFO system according to the present invention.

FIG. 1 shows a high level block diagram representation of a multi-stream FIFO (first-in-first-out) buffering system 100 according to the present invention, from an external (i.e., "black-box") point of view. A FIFO unit 102 supports a plurality of logical FIFOs. This is illustrated in FIG. 1 by the dashed line graphics, representing some arbitrary number of FIFOs 104, each having some arbitrary depth. One or more input streams 112 feed into the FIFO unit. Each input stream can have a data width different from the other input stream, depending on the particular environment in which the FIFO unit is operating. In an embodiment of the invention, the FIFO unit features input data widths which are dynamically configurable. Control and other support logic contained in the FIFO unit buffers data received on each of the variable width input streams to one of the logical FIFOs 104. The data is then read out of a logical FIFO onto one of a number output streams 114. Not unlike the input streams, each output stream can have a data width different from another output stream, which in one embodiment is dynamically configurable.

The FIFO unit 102 can buffer data received on any one input stream 112 to any of the logical FIFOs 104 supported therein. Likewise data buffered in any one logical FIFO can be subsequently read out to any one of the output streams 114. In accordance with the invention, there is no data size restriction; that is, data coming in on an input stream having a first data width can be buffered and subsequently read out to an output stream having a second data width.

FIG. 1 also shows a tag memory store 106. This aspect of the invention accommodates the buffering of flag signals (variously referred to as control signals, status indications, status signals, and the like) associated with data received on the input streams 112. This memory store is optional. In one embodiment, the flag signals can be buffered along with the received data in the same memory store 102, in which case a separate tag memory store is not needed. However, the flag signals typically can be encoded in some manner to produce data, hereinafter referred to as "tags" or "descriptors", which typically occupy less storage than their corresponding flag signals. Consequently, to reduce the memory requirement of the FIFO unit 102, an optional separate tag memory store might be provided. This will be discussed in connection with FIG. 2 below.

Figure 2:
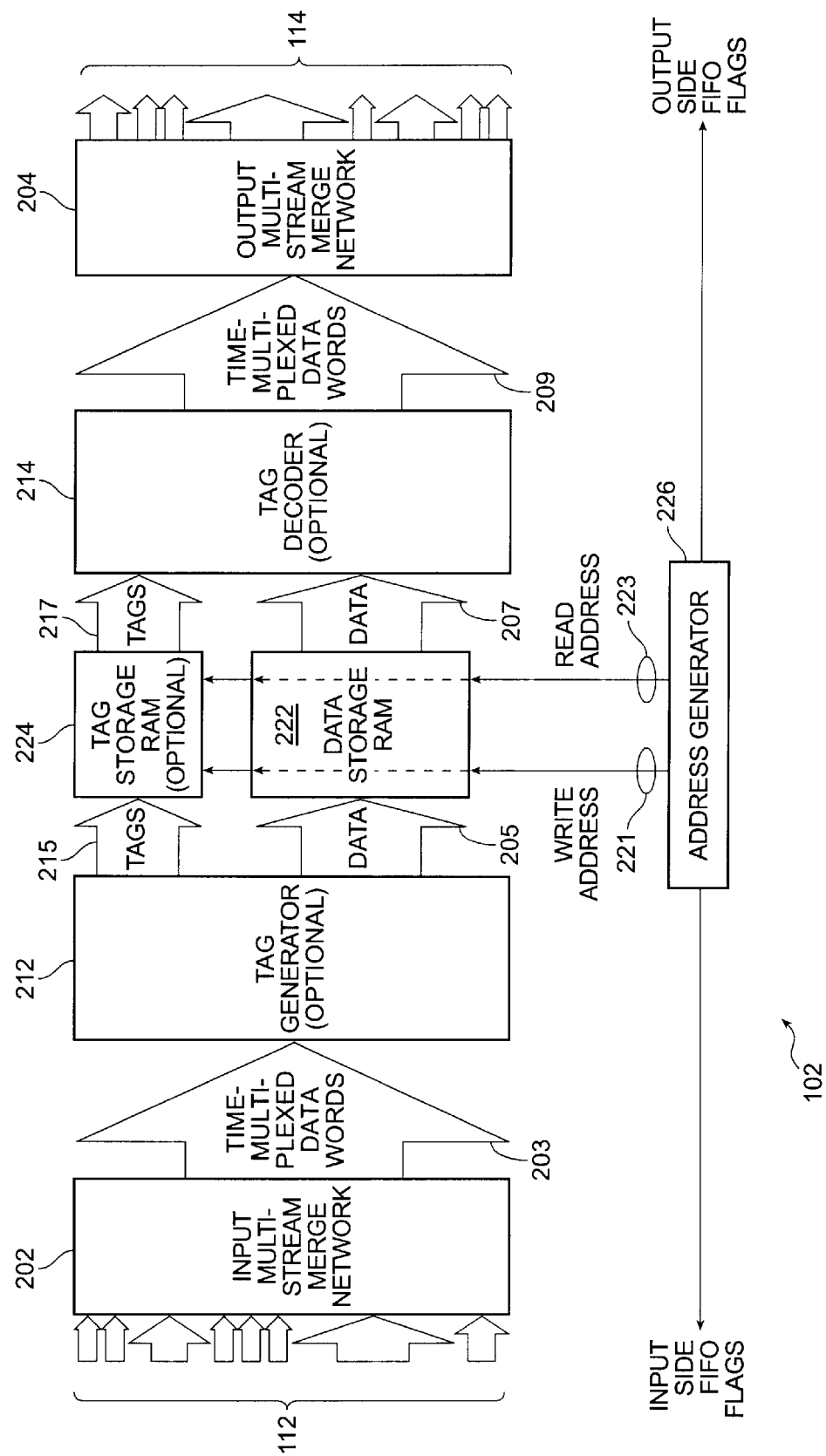
FIG. 2 illustrates an embodiment of a FIFO system according to the present invention.

Referring now to FIGS. 1 and 2, a high level description of the major components of the FIFO unit 102 will be given.

The input streams 112 feed into an input merge network 202. This network accepts the spatially separated input streams of various widths and converts them to produce an input time-division-multiplexed (TDM) stream 203 of constant width internal data (internal words). Thus, for example, assume the following three input streams feed into the input merge network:

stream 1—$A_0, A_1, A_2, A_3, A_4, A_5, A_6, A_7 \ldots$ (8-bit bytes)
stream 2—$B_0, B_1, B_2, B_3 \ldots$ (16-bit words)
stream 3—$C_0, C_1, C_2, C_3, C_4, C_5, C_6, C_7 \ldots$ (8-bit bytes)

The TDM stream 203 might comprise the sequence, where the constant width is 16 bits:

$A_0, A_1, A_2, A_3, B_0, B_1, C_0, C_1, C_2, C_3, A_4, A_5, A_6, A_7, B_2,$
$B_3, C_4, C_5, C_6, C_7 \ldots$ The input TDM stream 203 feeds into an optional tag generator unit 212 which creates special descriptors or tags that are used to encode flag signals that may be presented with the incoming data. The tag generator produces a data stream 205 which comprises the input TDM data stream absent the flag signals, and a separate tag stream 215. The tag generator is optional in that the flag signals may simply remain with their corresponding data throughout their journey through the FIFO unit 102.

It is observed that the flag signals are purely optional. If the flags are omitted, the entire tag generation, storage and decoding arrangements can be eliminated. In such a case, the logical FIFOs store only "raw" data with no associated flag information. This sort of arrangement is useful in, say, switching elements or buffering applications where there is no significance attached to different data words or bytes during processing.

A data storage RAM 222 provides the logical FIFO buffers 104 which hold the data contained in the data stream 205. An optional tag storage RAM 224 receives the tag stream 215 in those embodiments of the invention where tag processing for the flag signals is desired. An address generator 226 produces the proper write address sequence 221 required to direct incoming data to its corresponding logical FIFO. The address generator also produces the read address sequence 223 needed to read out the correct logical FIFO for a given output stream 114.

The output 207 of the data storage RAM 222 feeds into an optional tag decoder unit 214, as does the output 217 of tag storage RAM 224. The tag decoder unit produces a TDM output data stream 209, wherein the tags are decoded to re-generate the originally supplied flag signals, which in turn are re-associated with the appropriate data words or bytes. An output merge network 204 accepts the TDM output data stream and converts the stream to the spatially separated output streams 114, taking into account the data width of the data from the data stream 209 and the width of the output stream 114 on which the data is placed.

The input streams 112 and the output streams 114 each comprises a plurality of signal lines. For example, in one embodiment, the input streams 112 comprise 256 signal lines. However, the signal lines do not have to be defined a priori as belonging to one input stream or another, or as having a particular data width. The signal lines can be dynamically configured, and so can vary as to input stream and data width. The same is true for the output streams 114.

Figure 3:
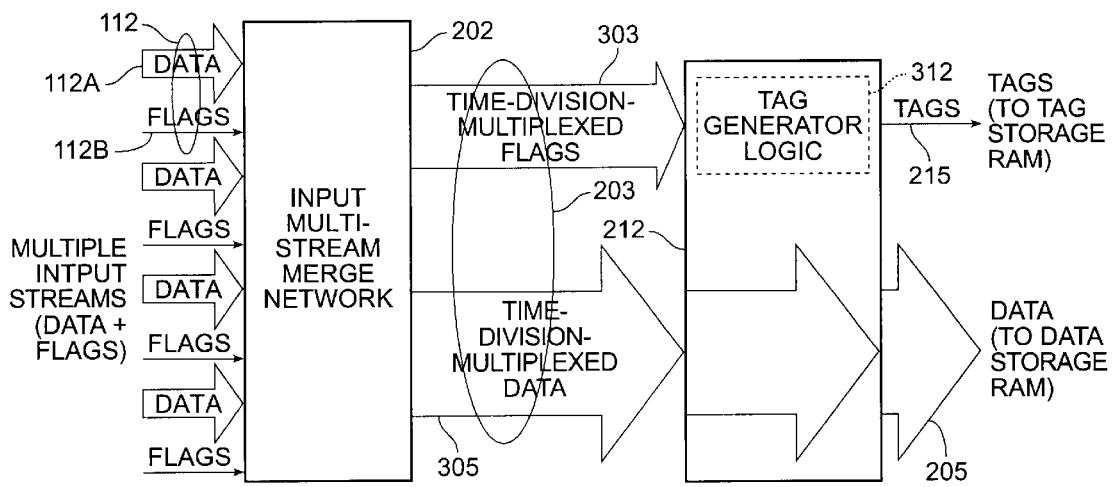
FIG. 3 details the tag formation aspect of the FIFO system as shown in the illustrative embodiment of FIG. 2.

Referring now to FIG. 3, an optional tag generator unit 212 is provided. The tag generator is optional, and omitted if the data is not accompanied by flags. In those situations where flags are associated with the data, the tag generator unit accepts the flag signals that are present in the data streams and encodes them into tags or descriptors. Such encoding is done to reduce the memory space occupied by the flag signals and also to simplify their processing. For example, if each incoming data character is associated with a valid flag denoting whether it is an actual data character or merely an idle/invalid character, the tag generator can convert the set of valid flags into a count of the number of valid characters in the data word output by the merge network. Such a count is more useful for normal FIFO control purposes (e.g., tracking the number of bytes in the FIFO).

If optional flags are included in the FIFO system, the input merge network 202 accepts the input flags along with the input data, and performs the same process of concatenation and width extension as is done on the data. Essentially, the flags may be regarded simply as an extension of the data characters. For example, if four flag signals are input with every eight data bits, the input merge network can be structured to process a 12-bit data stream obtained by concatenating the 4 flags to the 8 data bits.

FIG. 3 illustrates that each input stream 112 comprises a data portion 112A and a flag portion 112B. An example of a data stream comprising a data portion and a flag portion would be a bus used to transport received packet or cell information. In this case, the packet reception unit would denote the first byte of each packet with a special flag (commonly referred to as Start-Of-Frame (SOF) or Start-Of-Packet (SOP)), and the last byte with another flag (the End-Of-Frame or End-Of-Packet, EOF or EOP respectively). In addition, the packet reception unit would also mark errored packets with an ERROR flag and the spaces between packets with an IDLE flag. These flags would be used in conjunction with the data bytes by downstream processing units, when processing the packet streams.

As will be explained below, the input merge network 202 concatenates and time-division-multiplexes the data portion 112A, received on the various input streams 112, to produce an internal data stream on the input TDM stream 203. The input merge network processes the flag portion 112B in the same manner. The input merge network produces a data stream 305 comprising the TDM (time-division-multiplexed) internal data absent the flags, and a stream of TDM flags 303 which together comprises the input TDM stream. The TDM stream feeds into the tag generator unit 212.

As can be seen in FIG. 3, the tag generator comprises tag generator logic 312 for processing the TDM flag stream 303 to produce the tag stream 215. The data stream 305 is simply output directly to the data stream 205. The tag generator logic 312 is made very simple by the fact that the input merge network 202 outputs coherent data words and their associated flags. In most cases, the tag generator logic can be implemented with a small amount of purely combinatorial logic. If sequential logic is required for encoding the tags, then some form of multi-context state machine or microsequencer may be used instead.

It can be appreciated by those of ordinary skill in the relevant arts that any required encoding function may be implemented by the tag generator logic 312. For instance, a simple conversion of per-character data-valid flags to a binary-coded count of the number of valid characters may be implemented as a purely combinatorial function. The logic simply provides the operation of adding up all the "valid-character" flags that are set to a logic '1' in each cycle to obtain an output tag for that cycle. More complex encodings are also possible.

The stream of tags output by the tag generator unit 212 should be aligned with the stream of output data. Note that any number of pipeline stages (i.e., fixed delays) may be implemented within the tag generator logic if the same number of pipeline stages are placed in the path taken by the data, so as to keep the data and tags aligned. In such a case, the tag generator unit would include an appropriate number of delay stages to delay the incoming data stream 207.

Due to the fact that the data produced by the input merge network is coherent and time-division-multiplexed in a regular pattern, only one (time-division-multiplexed) tag generator unit 212 is required, regardless of the number and width of the input data streams. This also aids the dynamic reconfiguration properties of the flexible FIFO. Prior art implementations that rely on arrays of shift registers, or on data striping methods, will require multiple tag generators (typically equal to the number of input streams), thus increasing the complexity of the system. Indeed, these prior art schemes may require substantially more complex tag generator schemes to accommodate reconfigurable input datapath widths.

Referring back to FIG. 2, the storage RAMs 222, 224 used to hold data and optional tag information are assembled from standard dual-port RAM blocks, with separate address and control signals for the write (input) and read (output) ports. There is a single address space for accessing the memory locations in the data storage RAM (and the optional tag storage RAM), thus simplifying the address generation mechanism and supporting control logic.

The size (memory capacity) of the data storage RAM should be equal to at least the sum of the sizes of the logical FIFOs that are to be constructed. Preferably, the width of the RAM should correspond to the width of the TDM datapaths 205, 207 of the input and output merge networks. The speed of the RAM should be selected according to the maximum aggregate bandwidth (i.e., the sum of the bandwidths of all of the input or output data streams, whichever is greater). In one embodiment, the clock rate on the input side of the RAM may be different from that on the output side of the RAM. This allows the input bandwidth into the FIFO to be different from the output bandwidth.

In another embodiment of the present invention, the data and tag storage RAMs 222, 224 may be combined into one single RAM. As the merge networks 202, 204 are used to generate and process both tags and data in the same manner, the streams of time-division-multiplexed tags and data are always synchronized with respect to each other. Consequently, a single wider RAM may be used rather than two RAMs in order to store both.

In yet another embodiment of the invention, the data storage RAM 222, (and, if required, the tag storage RAM 224) may be comprised of smaller physical RAM chips. This may be required if the width of the RAM becomes difficult or impossible to realize with present technology. For example, a 256-bit-wide data storage RAM can be realized instead with four paralleled 64-bit-wide RAMs. Of course, the smaller RAMs would be addressed using identical addresses in order to access the same word in each of the four smaller RAMs to effectively access a 256-bit-wide datum.

The data storage RAM 222 and optional tag storage RAM 224 serve to hold the data being written to the multiplicity of logical FIFOs 104 that are set up within the physical buffering system being described. The data storage RAM is used to hold the time-division-multiplexed data words 205 produced by the input merge network 202, and the tag storage RAM holds the corresponding time-division-multiplexed tags 215 created by the optional tag generator unit 212 from the flags associated with the incoming data. For simplicity, the logical FIFOs holding the tags are created and addressed identically to the logical FIFOs holding the data (in separate memories) in a preferred embodiment, but may also be handled separately if desired.

Note that only one data storage RAM 222 and only one tag storage RAM 224 are required, regardless of the number or composition of the incoming data streams or the number of logical FIFOs. The time-division-multiplexed and coherent nature of the data words produced by the input merge network 202 (i.e., data from multiple streams are not mixed together) allows data from each time-slot to be written to the appropriate logical FIFO by simply manipulating the write address supplied to the RAM; no additional logic is required. As noted above, ut is also possible to combine the data and tag RAMs.

Figure 4:
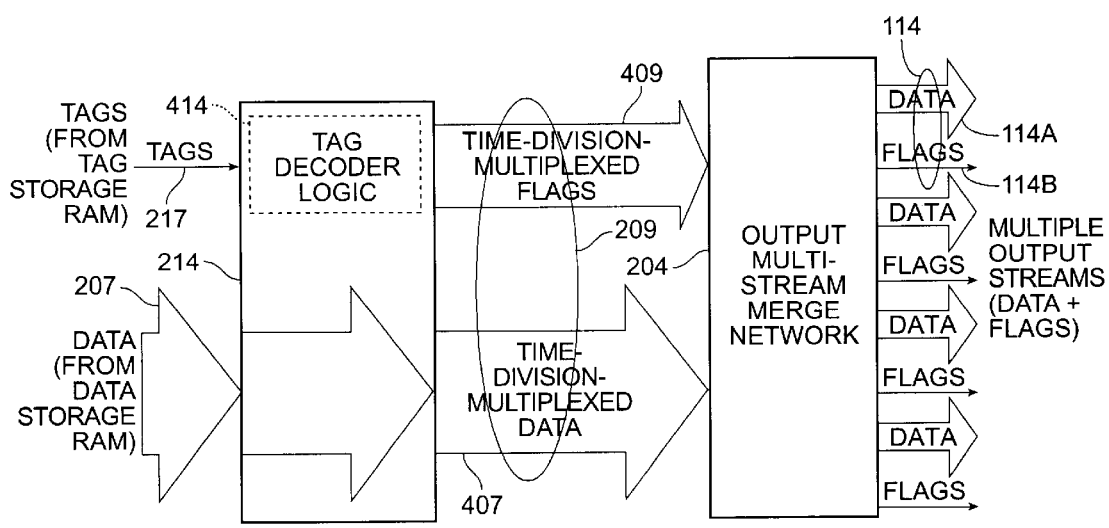
FIG. 4 details the tag decoding aspect of the example embodiment of the FIFO system shown FIG. 2.

Referring to FIG. 4, the optional tag decoder performs the reverse function to the tag generator, accepting an encoded tag or descriptor read from the tag storage RAM (for each data word read out from the data storage RAM) and converting the tag to a set of per-character flags that are in turn associated with the data. Again, only one time-division-multiplexed tag decoder is required, regardless of the number and nature of the output data streams.

It can be seen in FIG. 4 that the construction of the optional tag decoder unit 214 is similar in principle to that of the tag generator unit 212, but operating in reverse. The sequence of tags 217 read out of the tag RAM 224 (at the same time as the corresponding data words are read out of the data RAM, by the way) are fed to tag decoder logic 414 contained in the tag decoder unit to produce the TDM flag stream 409. The data stream 207 read from the data RAM 222 feeds through unchanged. The TDM flag stream and the data stream are combined to produce the TDM output data stream 209.

In its simplest form, the tag decoder logic 414 is organized as a purely combinatorial function that converts the encoded tags to a per-character set of flags without introducing any additional clock cycles of delay. If sequential logic or pipelining is used, the delay incurred within the tag decoder may be compensated for by an equal number of delay stages placed in the path of the data read from the data storage RAM 222. In such an embodiment of the invention, the tag decoder unit 214 may comprise the needed delay stages in addition to the tag decoder logic.

The tag decoding function should generally implement the inverse of the encoding performed by the tag generator unit. The decoded tags are then serialized and steered to the required data streams 114, in the proper sequence (matching that of the data) by the output merge network 204.

It is note that the tag decoding function may also implement additional capability as required by the system. For example, the tag decoding function might include examining the tags (prior to decoding them into flags) to determine whether sufficient data are available to be read out on to an external bus, based on special rules that governed the operation of the external bus. This sort of processing does not modify either the data or the tags, or constitute processing functions performed upon the packets comprising the data, activities which are typically performed by downstream entities attached to the external bus. This processing merely facilitates the proper implementation of the external bus protocol.

Figure 5:
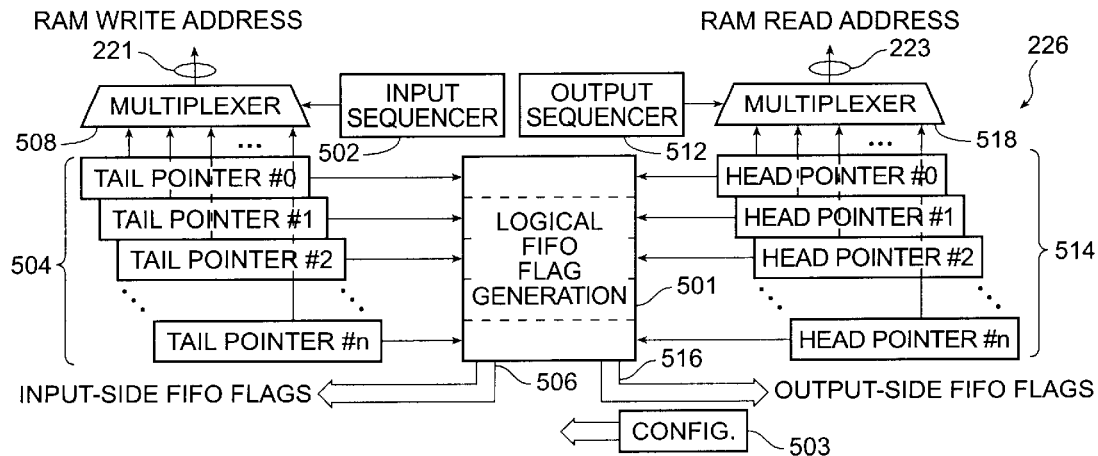
FIG. 5 is an illustrative embodiment of the address generator of the FIFO system according to the present invention, as illustrated by the example embodiment of FIG. 2.

Referring to FIG. 5, the address generator unit 226 is principally responsible for maintaining the multiple logical FIFOs 104 (FIG. 1) within the data storage RAM 222. In an illustrative embodiment of this aspect of the invention, the address generator is implemented simply as multiple instances of the functionality present in a traditional FIFO controller, with a different instance being assigned to each logical FIFO built within the system. The address generator produces the address sequences 223, 221 required for performing reads and writes to these FIFOs. The address generator computes and outputs status flags (full, empty, etc.), typically used with FIFOs, corresponding to the state of each logical FIFO.

According to one embodiment, the address generator unit 226 includes a tail pointer data store (registers) 504 which contains addresses pointing to the end of each of the logical FIFO lists contained in the data storage RAM 222. The output of each tail pointer feeds into a multiplexer 508. Input sequence logic 502 provides a select signal to control the multiplexer to output one of the tail pointer addresses onto the write address lines 221.

A head pointer data store (registers) 514 contains the addresses pointing to the beginning of each of the logical FIFOs. Another multiplexer 518 receives each of the head pointers. Output sequence logic 512 controls the multiplexer to output one of the head addresses onto the read address lines 223.

The address generator block 226 generates the sequence of addresses required to implement and manage (i.e., write to and read from) the logical FIFOs set up within the storage RAMs. These addresses are generated in synchronism with the time-division-multiplexing sequence created by the input and output merge networks 202, 204. As the time-division-multiplexing sequences are regular and repetitive, it is simple for the address generator to select and output the appropriate addresses for each time slot in the sequence. A single write address and a single read address are generated for each time slot in the input and output sequences, respectively. The single write address is used to write into the data storage RAM 222 and into a correspondingly addressed location in the optional tag RAM 224. Similarly, the single read address is used to read from the data storage RAM and from a correspondingly addressed location in the optional tag RAM.

There is configuration logic 503 used to define the region of memory assigned to each logical FIFO 104, and flag logic 501 that produces the necessary full/empty flag signals required to control the FIFO operation. The input and output sequencers 502, 512 are used to select and update the appropriate logical FIFO pointer registers 504, 514 in the proper sequence, corresponding to the sequence in which data are time-division-multiplexed on to the RAM inputs and outputs by the input and output merge networks 202, 204.

In operation, successive words of data produced by the input merge network 202 are written to the RAM 222, 224 at the locations indicated by the corresponding tail pointers. As each word is written, the tail pointer that was used to denote the location is incremented to point to the next available location. When data stored in one or more logical FIFOs must be read out and supplied to the output merge network 204, the corresponding head pointers are used to point at the desired read locations, and incremented after each read. The configuration logic 503 is used to determine the boundaries of the logical FIFOs for pointer increment purposes. The FIFO flags 501 are produced, for example, by comparing the head and tail pointers to determine whether the FIFO is full or empty.

The generation of the read and write addresses is simplified by the fact that there is only one data RAM, with constant width, and any access to the RAM writes or reads one word of data that belongs to the same channel (regardless of the channel data width). Thus the addressing mechanisms do not need to take the input or output data widths into account, as this is all handled by the input and output merge networks. A very simple address generation mechanism, closely resembling a classical FIFO head/tail pointer scheme is extended to cover multiple logical FIFOs is used. This is in contrast to the much more complex prior art addressing mechanisms required for striped or interleaved memory structures.

Note that more sophisticated or more efficient address generator units are possible. For example, it is possible to realize the multiple instances of FIFO control logic using a small RAM or register file to hold all of the pointers and configuration registers, and indexing into the RAM according to the same sequence used to produce the read and write addresses. The specific design will depend on factors which are not relevant to the practice of the present invention.

Figure 6:
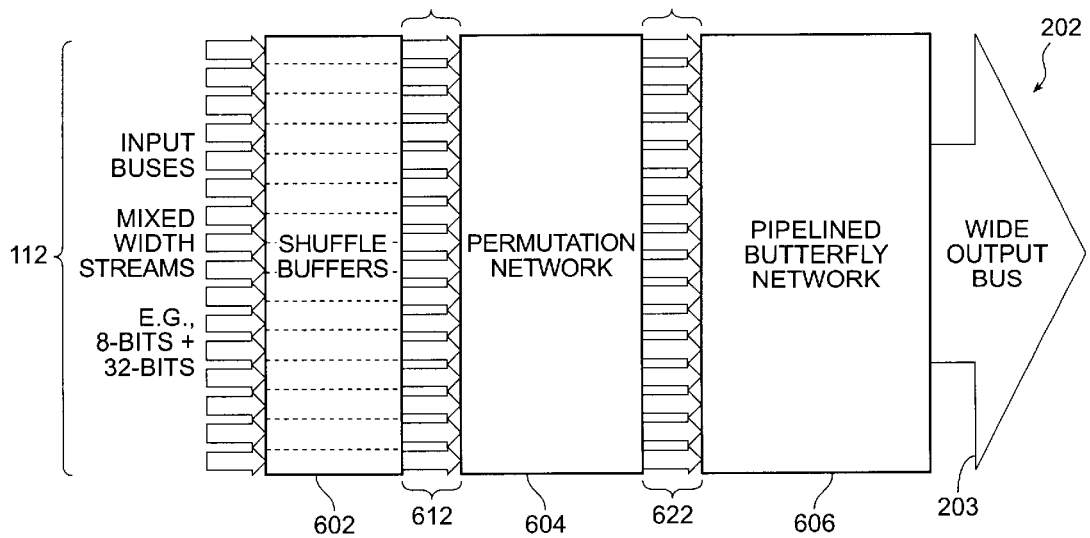
FIG. 6 shows and embodiment of an input merge network in accordance with the invention.

Turn now to FIG. 6 for a discussion of the input merge network 202. In accordance with a preferred embodiment of this aspect of the invention, the input merge network comprises a combination of three elements: A shuffle buffer system 602 accepts, buffers and re-orders incoming data on the input stream 112, each possibly having different widths to produce a first plurality of intermediate streams 612. A permutation network 604 rearranges the intermediate streams 612 to create coherent groups 622 based on the input data width. A pipelined Butterfly network 606 performs the actual merging and data width conversion process on the coherent groups 622 to produce the time-division-multiplexed TDM output stream 203.

For the purposes of the following discussion, we denote by W the lowest common divisor of the width of each of the (narrow) streams that are merged to form the wide time-division-multiplexed output, and N as the ratio of the width of the output stream to W. Consider the following example, if 8-bit, 32-bit and 64-bit streams are being merged to create a single 128-bit time-division-multiplexed output stream, then W is 8 (the minimum stream size is 8 bits, and this is also the common factor among all the input streams) and N is 32 (there are 32 such 8-bit streams that can be multiplexed into a 128-bit output). Various other parameters will be defined as required. The fundamental data unit in this case is an 8-bit byte.

The shuffle buffer system 602 accepts data from upstream entities that generate the disparate data streams 112. An example of an upstream entity would be a SONET framer (or set of framers) implemented within the device, capable of processing a group of multiplexed payload streams with different bandwidths. For instance, one could have an OC-192 framer capable of processing any combination of multiplexed STS-12, STS-48 and STS-192 payload streams up to the physical limit (STS-192). Thus, if the incoming SONET stream comprised 8 STS-12s and 2 STS-48s, then the input to the shuffle buffers would consist of eight 8-bit data streams and two 32-bit data streams all sharing one 256-bit bus.

The shuffle buffers comprising the shuffle buffer system perform three principal functions:

Input data on the input stream 112 are accumulated until sufficient data are available in each buffer. At this point, the data are read out in a shuffled order (relative to the order in which they were written to the buffer). The shuffling must be performed differently depending on the ratio of the widths of the input data stream to the output bus width of the complete apparatus. The purpose of the shuffling is to properly order the data input to the pipelined Butterfly network such that they may appear in coherent fashion at its outputs. The shuffling is done in a deterministic manner, which is described in more detail in a succeeding section.

If the input data are arriving in an intermittent or bursty fashion (i.e., with long gaps between blocks of data), the shuffle buffers may be configured to accumulate data until complete blocks are available within the buffer prior to outputting the data to the permutation network. Once a complete block is available, the shuffle buffer will write out the entire block in sequence (per the foregoing described shuffling process) with no breaks. The size of the block is normally equal to the width of the output data bus 203 from the pipelined Butterfly network 606. The purpose of doing this is to ensure that the data presented on the output 203 of the input merge unit has no gaps within individual words. Note that an ancillary function implemented by the shuffle buffer units is to present dummy data to the permutation network when it is empty, or when insufficient data are present to form a complete block. This block formation function of the shuffle buffers is optional; the stream merging process will continue to operate in its absence, but with the caveat that the output data may have "holes" in the words.

If the input data streams are synchronous to different clock signals (as is common when the different data streams are being generated by separate physical layer devices), the shuffle buffers may be configured to synchronize the data to a common clock reference. This synchronization process is done in the standard manner necessary to transport data between different clock domains. Again, this is strictly an optional function of the shuffle buffer and has no direct impact on the stream merging functions.

Figure 7:
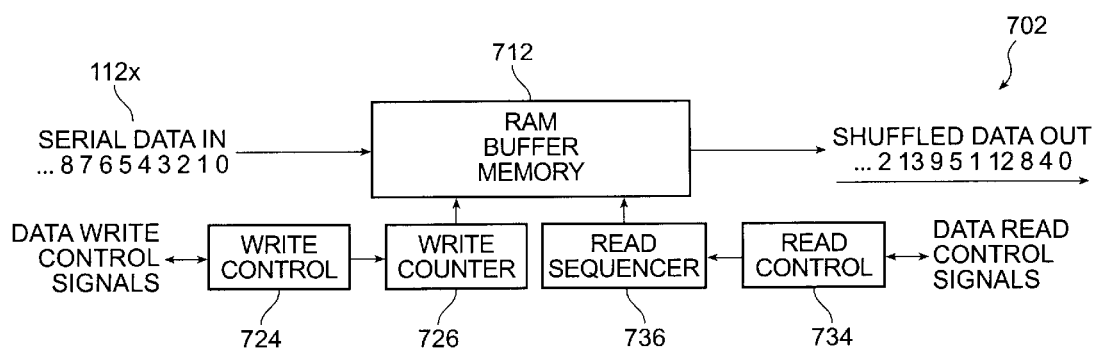
FIG. 7 illustrates an example embodiment of a shuffle circuit used in the input merge network shown in FIG. 6.

Referring now to FIG. 7, an embodiment of a shuffle buffer is shown. Each shuffle buffer 702 comprises three primary sub-sections: a RAM buffer memory 712; write logic comprising a write address generation counter 726 and some write control logic 724; and read logic comprising a read address sequencer 736 and some read control logic 734.

The RAM buffer memory 712 holds the data being accumulated from one of the input streams 112x, until it can be read out in shuffled order by the read logic 734, 736. This buffer is B×W bits in size, where B is the number of data units (words) that can be held and W is the width of each data unit as supplied to the permutation network 604. Typically, B is some integer multiple of the number of data units N that comprise a single word placed on the output bus 203 of the pipelined Butterfly network 606. Thus, if the Butterfly network output is 128 bits wide and the data units are comprised of 8-bit bytes, the buffer memory 712 will be some multiple of sixteen 8-bit bytes in size. The shuffling process requires this multiple to be a minimum of 1, as shuffling cannot begin until an entire output word's worth of data are present in the buffer. Normal values for the multiple are in the range between 2 and 3 (implying a 32×8 or 48×8 RAM). The purpose of having more than N units of storage in the RAM is to permit fresh data to be written into the buffer while previously stored data are being read out in a shuffled fashion.

The write logic 724, 726 generates the address sequence required for writing data into the RAM buffer 712, and also implements the control functions needed to prevent data being written into the buffer when no free space exists. For example the logic which provides the write control functions for a conventional FIFO buffer can be used. The address sequence is very simple, being an incrementing series of addresses starting at 0 and wrapping around after the end of the RAM buffer has been reached.

The read logic 734, 736 generates the special sequence of addresses that causes the data to be read out of the buffer memory 712 in shuffled fashion. This logic is also very similar to that of standard FIFO queue read control units, but with two exceptions. First, the series of read addresses generated for successive words read out of the FIFO is not sequential. Instead, the address sequence forms an interleaved pattern. Second, the read logic does not permit reading to begin until there is sufficient data to form a complete sequence; i.e., enough to form a complete data word at the output of the Butterfly network 606.

Table I below gives some examples of the sequence in which data must be read out for various ratios between the output and input data word sizes for various streams. It is assumed that the width of the output data word is 16 bytes (i.e., the data unit being a byte of 8 bits).

The general process for obtaining the sequence of addresses to use in order to properly shuffle the data read out of the buffer may be described as follows. Let N represent the number of atomic data units in each output word (at the output of the Butterfly network), and let k represent the number of atomic data units in each input word for a given stream. Compute the quantity d as being the ratio of N divided by k. This quantity is referred to as the step distance. Now follow the algorithm below:

1) Start the read address sequence at zero (i.e., let the first read address be 0) and read out the first data word.
2) Increment the read address by the step distance d.
3) If the incremented read address is greater than or equal to N then subtract N from the result and add 1 to it.
4) Read the next data unit at the current read address.
5) Repeat steps 2, 3 and 4 until the read address becomes 15 (or, equivalently, sixteen words have been read out of the buffer), then stop.

Note that the address sequence described above assumes that the buffer size B is only N data units. If B is some multiple of N, the same algorithm is used to derive the sequence, but the read address generated by the algorithm is first offset by an incrementing multiple of N prior to using it to access the buffer. The effect is to divide the buffer into blocks of N units, and to read the data within a given block according to the computed sequence, after which the next block is read, and so on.

As previously noted, two optional features may be included as part of the functions to be implemented by the shuffle buffer 702: synchronization and data accumulation.

Data accumulation is required when either the input (write) data rate is lower than the output (read) data rate, or when gaps exist in the write data stream. The normal means of handling gaps in the data stream, as usually implemented in a regular FIFO queue, are employed on the write side of the shuffle buffer system 602. On the read side, however, there may be periods when a given shuffle buffer is either completely empty or does not contain enough data to permit the reading process to start (i.e., there are less than N data units in it). The shuffle buffer may therefore be constructed so as to send exactly N "dummy" (invalid) data values to the permutation network whenever this situation is encountered, and to continue to send groups of N dummy values until the FIFO contains N or more data items. This ensures that the data stream between the shuffle buffer system and the

TABLE I

| # Byte Lanes/Input Word (Intrinsic Input Word Width) | 1 (8-bits) | 2 (16-bits) | 4 (32-bits) | 8 (64-bits) | 16 (128-bits) |
|---|---|---|---|---|---|
| Read Addr #0  | 0  | 0  | 0  | 0  | 0  |
| Read Addr #1  | 1  | 8  | 4  | 2  | 1  |
| Read Addr #2  | 2  | 1  | 8  | 4  | 2  |
| Read Addr #3  | 3  | 9  | 12 | 6  | 3  |
| Read Addr #4  | 4  | 2  | 1  | 8  | 4  |
| Read Addr #5  | 5  | 10 | 5  | 10 | 5  |
| Read Addr #6  | 6  | 3  | 9  | 12 | 6  |
| Read Addr #7  | 7  | 11 | 13 | 14 | 7  |
| Read Addr #8  | 8  | 4  | 2  | 1  | 8  |
| Read Addr #9  | 9  | 12 | 6  | 3  | 9  |
| Read Addr #10 | 10 | 5  | 10 | 5  | 10 |
| Read Addr #11 | 11 | 13 | 14 | 7  | 11 |
| Read Addr #12 | 12 | 6  | 3  | 9  | 12 |
| Read Addr #13 | 13 | 14 | 7  | 11 | 13 |
| Read Addr #14 | 14 | 7  | 11 | 13 | 14 |
| Read Addr #15 | 15 | 15 | 15 | 15 | 15 | permutation network 604 is delimited in units of N, and avoids "holes" within the output data words produced by the pipelined Butterfly network 606.

Synchronization is easily accomplished by noting that the shuffle buffer structure very closely resembles a standard synchronizing FIFO queue (with the exception being that the read logic 734, 736, generates a variable sequence of addresses rather than an incrementing sequence). Therefore, the standard means of clock synchronization and transport of data values across clock boundaries may be employed to allow the read and write ports of the shuffle buffer to use different clock references.

As many shuffle buffers 702, each of width equal to one data unit W, are required as there are data units in the input streams 112. A total of N shuffle buffers are therefore needed (according to the notation already described). All of these buffers can operate independently with regard to the input (writing) of data, but must be synchronized to each other with respect to reading; i.e., the same clock is supplied to all buffers for reading, and data unit #0 is read out of all the buffers within the same clock cycle. This ensures that the data presented to the permutation network will be aligned with regard to the different data streams, a necessary condition for merging data so as to obtain properly ordered words at the output of the pipelined Butterfly network. If this condition is not satisfied (i.e., the read-out of data from different buffers is not aligned) then the pipelined Butterfly network will maintain coherence with regard to the separate streams (i.e., it will not merge data units from different streams into the same output word) but there may be "holes" in the output words, and data may be misaligned within individual output words.

Referring back to FIG. 6 for a moment, the permutation network is used to rearrange the spatial order of the inputs from the upstream data sources before they are presented to the pipelined Butterfly network. This operation is performed to permit any arbitrary arrangement of input streams 112 (i.e., to allow arbitrary assignment of logical streams or components of streams to the physical wires on which data are presented to the shuffle buffers). For example, a particular incoming logical 32-bit stream may be physically configured such that its constituent 8-bit byte lanes are scattered over the various input data buses comprising the input streams 112 in some random order, possibly intermixed with byte lanes belonging to other streams. The permutation network should then be configured to re-order the positions of the input streams 112 so that the byte lanes for the 32-bit stream are contiguous and located on a specific boundary.

The function of the permutation network is to allow any arbitrary (but non-conflicting) assignment of input signal lines to data streams, or to byte lanes within a given data stream. Given such an arbitrary assignment, the permutation network can be configured to re-order the spatial distribution of the input streams 112 to allow the pipelined Butterfly network to function properly. The permutation network may be formed from any rearrangeable multistage network, i.e., a network where any arbitrary one-to-one mapping between the set of inputs and the set of outputs may be implemented without blocking between paths. One of the simplest rearrangeable networks is the Benes network, which is well known in the literature.

Figure 8:
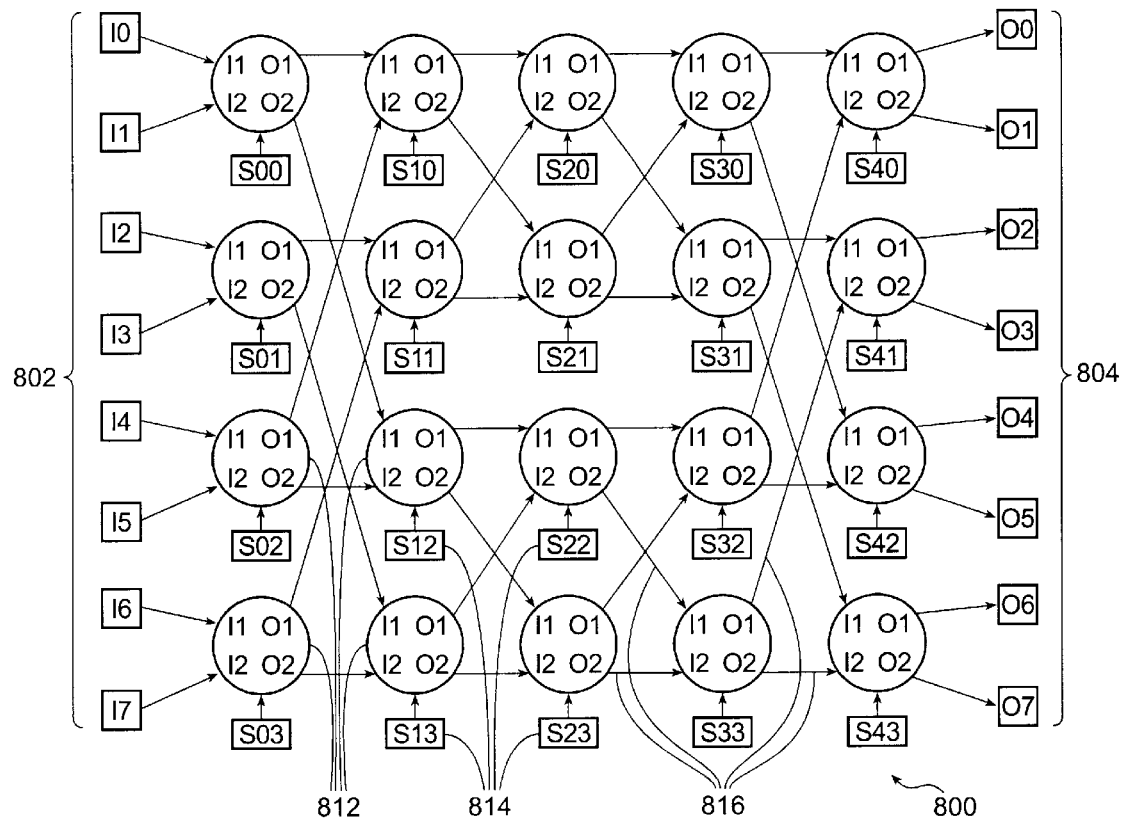
FIG. 8 shows one embodiment of a permutation network used in the input merge network shown in FIG. 6.

FIG. 8 shows an example Benes network 800 configured according to the invention, merely as an illustrative embodiment of a permutation network 604. The example network includes eight input buses 802 and eight output buses 804. The internal logic of the network is configured to couple the input buses in any one-to-one order to the output buses. The internal logic comprises a set of elements (or nodes, indicated by the circles) 812, interconnected by wires (or arcs). The width of each arc of the network is equal to the number of bits W in the basic data units presented on the input streams 112 to the apparatus (typically this is 8 bits). Each of the nodes of the network can be separately configured to act in "pass-through" mode or "cross-over" mode.

Figure 9:
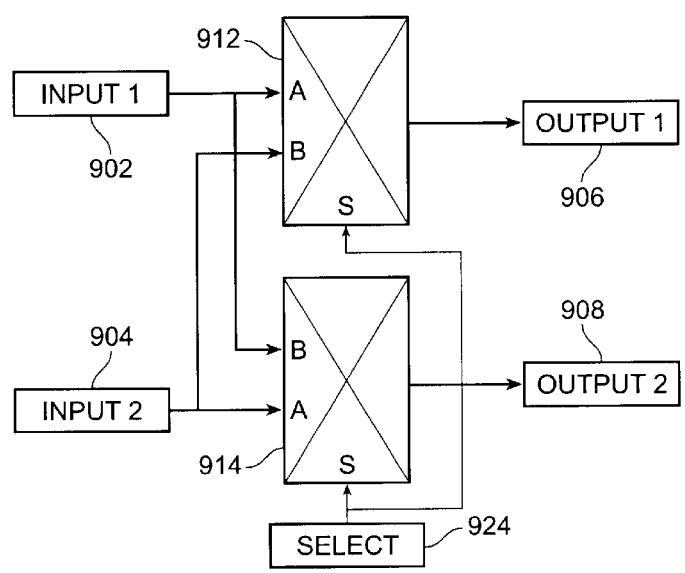
FIG. 9 illustrates a typical circuit that can be used to implement the nodes shown in the permutation network of FIG. 8.

Referring to FIG. 9, it can be seen that each node 812 comprises multiplexer logic. First and second multiplexers (mixes) 912, 914 are arranged in a cross-coupled configuration. A first input 902 is coupled to an "A" input of the first mux and to a "B" input of the second mux. A second input 904 is coupled to the "B" input of mux 912 and to the "A" input of mux 914. A select signal 924 is coupled to the select inputs of each mux, selecting the "A" input when the select signal is at a first logic level and selecting the "B" input when the select signal is at a second logic level.

For example, when the select signal 924 is set to a logical '0', Input 1 is connected to Output 1 and Input 2 is connected to Output 2 (i.e., the node is configured to pass data straight-through). When Select is a '1', then Input 1 is connected to Output 2 and Input 2 is connected to Output 1 (i.e., the node is set up in a crossed configuration). With this multiplexer arrangement, it is well known that any one-to-one mapping can be set up between the inputs and the outputs.

Returning to FIG. 8, an example of an arbitrarily chosen mapping of inputs 802 to outputs 804 for the 8×8 Benes network 800, consider Tables II and III shown below. Table II shows the desired mapping from input to output. Table II shows the logic states of the select signals 814 which control the nodes 812 to achieve the mapping of Table II.

TABLE II

| Mapping In -> Out |
| --- |
| I0 -> O6 |
| I1 -> O5 |
| I2 -> O4 |
| I3 -> O3 |
| I4 -> O2 |
| I5 -> O1 |
| I6 -> O0 |
| I7 -> O7 |

TABLE III

| S00 | S01 | S02 | S03 | S10 | S11 | S12 | S13 |     |     |     |     |
| --- | --- | --- | --- | --- | --- | --- | --- | --- | --- | --- | --- |
| 0   | 0   | 0   | 0   | 0   | 1   | 0   | 0   |     |     |     |     |
| S20 | S21 | S22 | S23 | S30 | S31 | S32 | S33 | S40 | S41 | S42 | S43 |
| 1   | 1   | 0   | 0   | 0   | 1   | 1   | 0   | 0   | 0   | 0   | 0   |

Other mappings will have some other combination of select signals 814 that establishes a set of paths 816 from the inputs 802 to the outputs 804 to satisfy that mapping. These select signals are expected to be statically configured prior to operation of the apparatus in accordance with the distribution of input data streams on the actual input signal lines, so as to re-order the data streams in a regular fashion (i.e., byte lanes belonging to the same data stream should be adjacent to each other, in ascending order, and aligned to natural boundaries).

As an example of such a rearrangement, consider the case of four 8-bit streams: $A_0, A_1, A_2$ and $A_3$; two 32-bit streams: $\{B_{03},B_{02},B_{01},B_{00}\}$; and $\{B_{13},B_{12},B_{11},B_{10}\}$, where the notation "$\{x,y,z,w\}$" represents the concatenation of byte lanes x, y, z and w; and one 64-bit stream denoted as $\{C_{07},C_{06}, C_{05},C_{04},C_{03},C_{02}, C_{01},C_{00}\}$. Consider, for example, that these streams are input in a "jumbled" order from left to right in the following order:

$\{C_{06}, A_0, B_{00}, B_{01}, B_{02}, B_{03}, B_{13}, A_1, B_{12}, C_{07}, C_{05}, C_{04}, C_{03}, C_{02}, C_{01}, C_{00}, B_{11}, A_2, B_{10}, A_3\}$

A 16×16 Benes network with 8-bit wide arcs may be used to re-order the streams into the regular form:

$\{C_{07}, C_{06}, C_{05}, C_{04}, C_{03}, C_{02}, C_{01}, C_{00}, B_{03}, B_{02}, B_{01}, B_{00}, B_{13}, B_{12}, B_{11}, B_{10}, A_3, A_2, A_1, A_0\}$ which is required by the pipelined Butterfly network to operate properly. As can be seen from the example, the byte lanes for individual streams must be grouped together in descending order, and the streams must be aligned on proper boundaries. Thus, 64-bit streams must be aligned on 64-bit boundaries, 32-bit streams on 32-bit boundaries, and 8-bit streams on 8-bit boundaries.

Benes networks can be constructed for an arbitrarily large number of total number of input data units N in the input data streams. Thus, N in the foregoing example is 20. For a system having N input data units, where N must a power of 2, the Benes network requires $(2 \times \log_2 N - 1)$ nodes.

In an alternate embodiment, register elements (not shown) may be interposed between stages of the permutation network 800 in order to pipeline the network and permit it to operate at high speeds. In a further embodiment, the permutation network may be placed upstream to the shuffle buffers rather than downstream (so that the data is re-arranged in the spatial domain before being re-ordered or shuffled in the time domain, rather than after). These modifications are obvious and commonly understood, and will not be dealt with further. It should also be noted that the permutation network may be omitted if the input streams 112 are already properly arranged.

Figure 10:
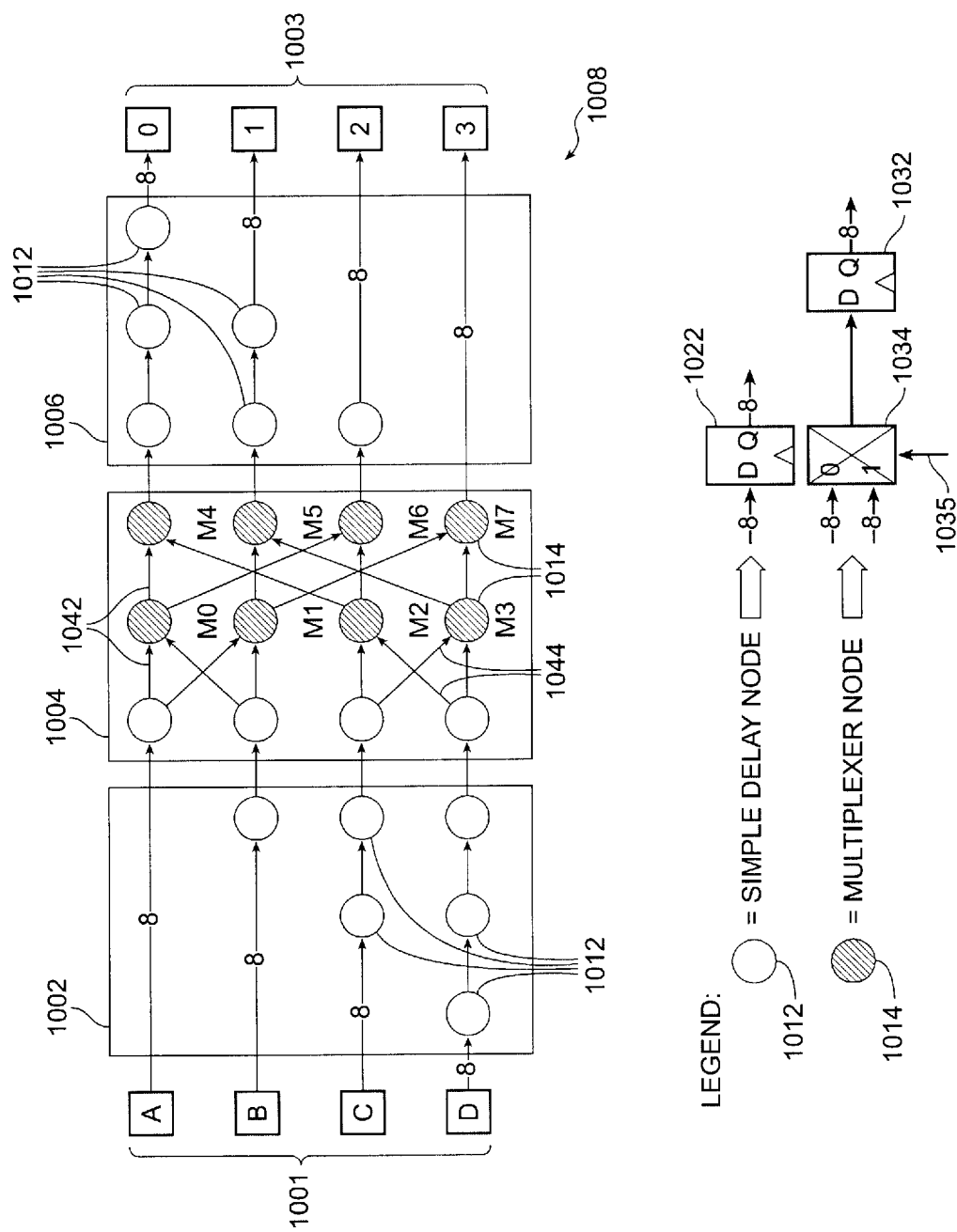
FIG. 10 shows one embodiment of a Butterfly network used in the input merge network of FIG. 6.

Referring again to FIGS. 6 and 10, the pipelined Butterfly network 606 provides the actual merging and width-extension of the various input streams 112 to produce the TDM data 203. As shown in FIG. 10, this network is topologically related to a Butterfly graph and hence the name, but is otherwise quite different. The pipelined Butterfly network comprises the following three sub-sections: An input delay network 1002 imposes different fixed delays (in units of clock cycles) on the various input streams. A Butterfly network 1004 component switches and sequences the stream in successive stages to merge and extend the data. The third sub-section is an output delay network 1006, which functions similarly to the input delay network but serves to align the outgoing data properly such that coherent words are placed on the output of the complete apparatus.

The pipelined Butterfly network 608 performs the actual data width extension and merging functions. As in the case of the Benes network, the pipelined Butterfly network increases in size according to the total number of data units N in the input data streams. Merely for illustrative purposes, FIG. 10 shows an example of a 4×4 pipelined Butterfly network 1008 for handling 8-bit input data streams. This illustrated example can extend and merge four incoming data streams 1001 (A–D), each of 8 bits in width, into a time-division-multiplexed sequence of 32-bit words at the output 1003 (0–3).

The input delay network 1002 comprises delay nodes 1012. Similarly, the output delay network 1006 comprises delay nodes 1012. As shown in the legend in FIG. 10, the delay nodes, indicated as white circles, are simple registers (delay stages) 1022. Thus in the input delay network, the input streams A, B, C, and D have an increasing delay relative to each other. For example, a first input stream (say input stream A, for example) has zero delay. A second input stream, B for example, has a delay of one clock unit. A third input stream, C in the example shown in FIG. 10, is delayed by two clock units. Finally, input stream D is delayed by three clock units. A similar delay configuration is provided in the output delay network 1006; however, in reverse order of the data streams A–D.

The Butterfly network portion 1004 of the pipelined network 1008 comprises delay nodes 1012 and mux nodes 1014. The mux nodes, indicated by hatched circles, comprise registers 1032 with 2:1 multiplexers 1034 at their inputs. All of the registers 1022, 1032 are clocked at the same time (i.e., the entire network is synchronous). Each multiplexer 1034 has a single select input 1035 that is used to select one of its two inputs. The select inputs are modified on every clock cycle in a regular and repeating pattern, as will be described later.

Figure 11:
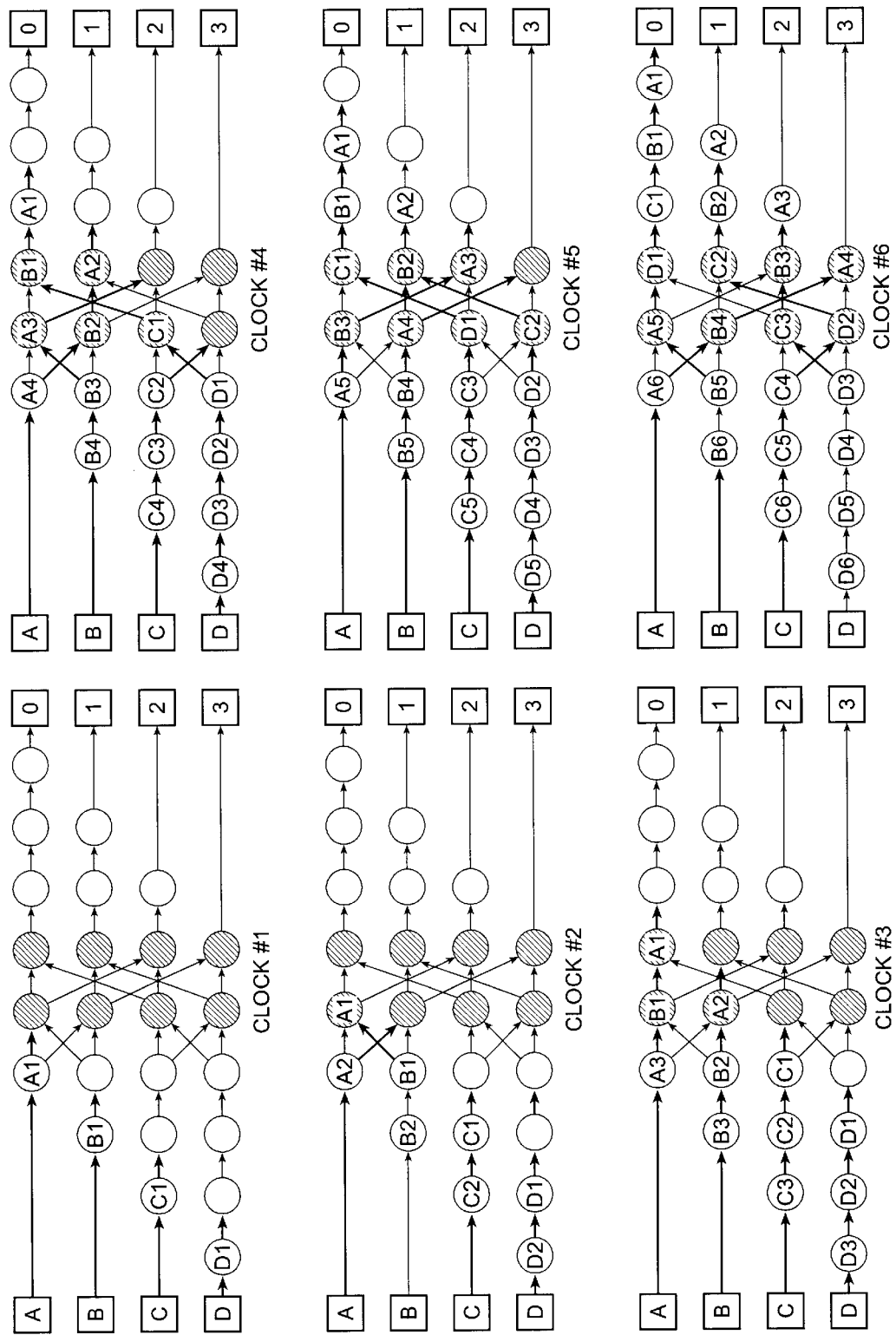
FIG. 11 highlights the sequencing in the Butterfly network of FIG. 10.

The sequence diagram of FIG. 11 depicts the sequence whereby four 8-bit streams of data (designated as data lanes A, B, C, and D) at the inputs 1001 may be organized by the above 4×4 network into interleaved 32-bit data words at the outputs 1003. We assume that all of the input streams A, B, C, and D present the first byte, the second byte, the third byte, etc. in unison on successive clocks. After six clock cycles, the first 32-bit word of data (containing four consecutive bytes drawn from the first input stream, A) will appear at the output bus. From then on, successive 32-bit words of data belonging to consecutive streams (B, C, and D) will be placed on the output bus in an interleaved manner at a data rate of one datum per clock (i.e. time slot). In the figures, each data lane is represented by:

$\{A1, A2, A3, A4, A5, A6, \ldots\}$,
$\{B1, B2, B3, B4, B5, B6, \ldots\}$,
$\{C1, C2, C3, C4, C5, C6, \ldots\}$, and
$\{D1, D2, D3, D4, D5, D6, \ldots\}$.

The output data words follow the sequence:

$\{A1, A2, A3, A4\}$,
$\{B1, B2, B3, B4\}$,
$\{C1, C2, C3, C4\}$,
$\{D1, D2, D3, D4\}$,
$\{A5, A6, A7, A8\}$,
$\{B5, B6, B7, B8\}$, etc.

The output stream comprises data lanes 0, 1, 2, and 3. Each data lane comprises a stream of corresponding data from each of the input streams. Thus, data lane 0 carries a data stream comprising A1, B1, C1, D1, A5, B5, and so on. Data lane 1, carries a data stream comprising A2, B2, C2, D2, A6, B6, and so on. Similarly for data lanes 2 and 3.

The heavy lines shown in FIG. 11 represent the paths taken by valid data words within a given clock cycle. Implicitly, they represent the multiplexer select signals that must be provided to the multiplexers 1034 of the mux nodes 1014. Each datum in each input stream is shifted in an interleaving fashion to a position in the output bus, both in terms of its position within the output word comprising the output and its position along the output stream. The delays provided by the input delay network 1002 on the input side and by the output delay network 1006 on the output side allow the shifted data to become aligned in the output stream at the point of being sent out at outputs 1003.

For example, with respect to FIG. 10, suppose a multiplexer select of '0' causes the multiplexers 1034 of mux nodes 1014 to select the horizontal inputs 1042 and a select of '1' causes the diagonal or cross inputs 1044 to be selected, then Table IV below provides the multiplexer select signals required for the multiplexer nodes at each clock cycle. Note that at clock #1, input is available only at the A input (FIG. 11), consequently the mux select for mux nodes M1–M7 are "don't cares". At clock #2, input is available only at the A and B inputs, and so mux nodes M2–7 are "don't cares", and so on until clock #4 when all the inputs carry data.

TABLE IV

| Clock Cycle | M0 | M1 | M2 | M3 | M4 | M5 | M6 | M7 |
|---|---|---|---|---|---|---|---|---|
| Clock #1 | 0 | — | — | — | — | — | — | — |
| Clock #2 | 1 | 1 | — | — | 0 | — | — | — |
| Clock #3 | 0 | 0 | 0 | — | 0 | 0 | — | — |
| Clock #4 | 1 | 1 | 1 | 1 | 1 | 0 | 1 | — |
| Clock #5 | 0 | 0 | 0 | 0 | 1 | 1 | 1 | 1 |
| Clock #6 | 1 | 1 | 1 | 1 | 0 | 1 | 0 | 1 |
| Clock #7 | 0 | 0 | 0 | 0 | 0 | 0 | 0 | 0 |
| Clock #8 | 1 | 1 | 1 | 1 | 1 | 0 | 1 | 0 |
| . | . | . | . | . | . | . | . | . |
| . | . | . | . | . | . | . | . | . |
| . | . | . | . | . | . | . | . | . |

As can be seen from the table, the multiplexer selects are a simple and regular repeating pattern. The selects for M0 through M3 (i.e., the first column of multiplexers) all toggle between 1 and 0 on every clock. The selects for M4 through M7 toggle between 1 and 0 on every other clock. In general, for the $i^{th}$ stage of a pipelined Butterfly network, the multiplexer selects will toggle after $2^i$ clock cycles. In addition, the starting value for the sequence of toggles is offset by 1 modulo $2^{(I-1)}$ for each successive multiplexer in the $i^{th}$ stage of multiplexers, as can be seen from the table. The resulting control logic is exceedingly simple to implement, consisting of a set of $2^{(I-1)}$ toggle flip-flops for the $i^{th}$ stage of multiplexers, with the toggle flip-flops being loaded with a constant pattern on reset and then always toggling on the appropriate clock cycle thereafter.

Figure 12:
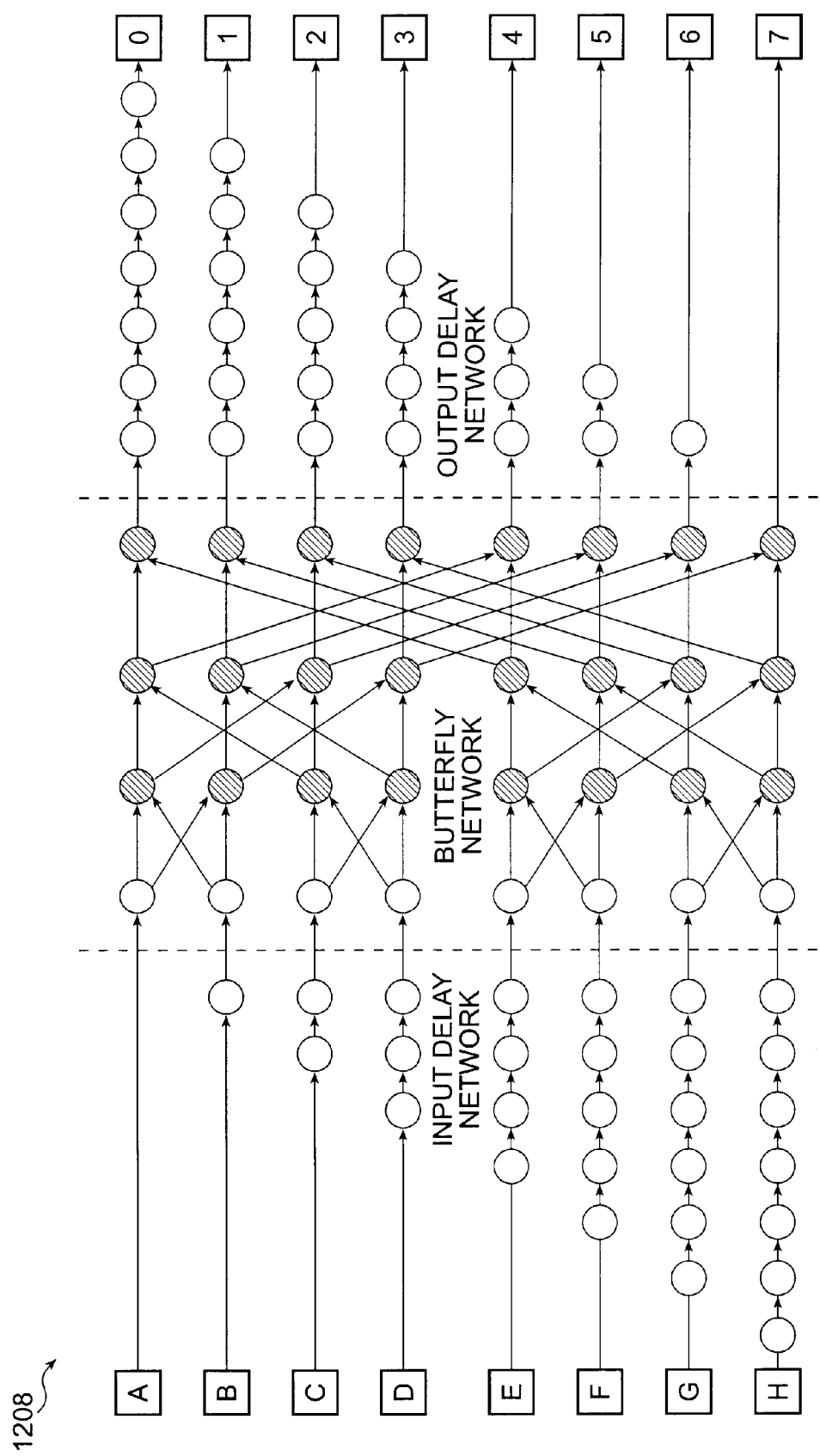
FIG. 12 shows another embodiment of a Butterfly network.

A pipelined Butterfly network may be built for any arbitrary number of input streams comprising N data units in total, where N must be a power of 2. To build such a network, there must be a total of (N×(N−1)/2) register units in the input delay network, N×$\log_2$N multiplexer units and N×($\log_2$N+1) register units in the actual Butterfly network, and (N×(N−1)/2) additional register units in the output delay network. The total latency, in clock cycles, from the input of the first data unit on the first (topmost) stream to its emergence at the output is ($\log_2$N+N). FIG. 12 shows an example of an 8×8 pipelined Butterfly network 1208, capable of handling eight streams of input data and generating an 8-wide time-multiplexed sequence of output data.

It is desirable to possess the ability to handle data streams of different widths in the same apparatus. For example, merging data streams from different physical layer devices having different speeds often involves varying data widths. Thus, in a preferred embodiment of the invention, varying data width processing is provided.

Two parameters in the foregoing disclosed input merge network 202 (FIGS. 1 and 12) must be changed in order to handle a variable data stream of width k units, where k is a power of b 2. First, the read ports of the shuffle buffers 602 for all the byte lanes of the given data stream must all be configured to shuffle the data being read out, according to the algorithm given above. Second, the first $\log_2$k stages of multiplexers 1034 of the pipelined Butterfly network must not be allowed to toggle, but must be frozen with their select inputs configured in straight-through mode.

Figure 13:
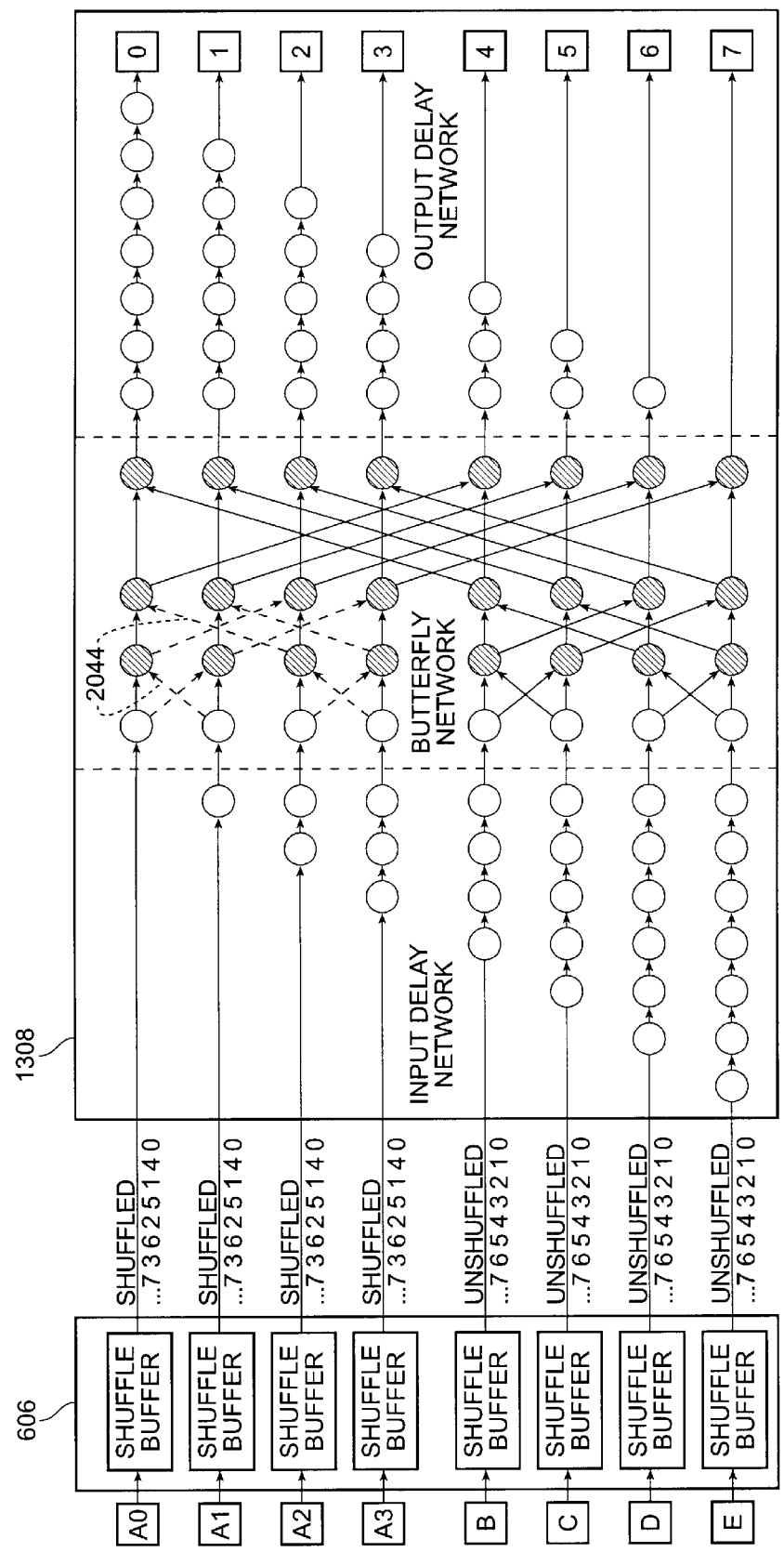
FIG. 13 shows a typical operational state of the input merge network of FIG. 6.

This aspect of the present invention is depicted in FIG. 13 in another illustrative embodiment of a pipelined Butterfly network 1308. Here, the cross-paths shown in dashed lines indicate de-activated paths. The figure assumes five input streams (four of which are 8-bits wide and one which is 32-bits wide) that must be merged on to a 64-bit output bus using 8 shuffle buffers and an 8×8 pipelined Butterfly network. The permutation network 604 is omitted here for simplicity, the streams being grouped and aligned on natural boundaries. The 32-bit data stream is denoted as {A0,A1, A2,A3}, and the four separate 8-bit streams are denoted by B, C, D and E.

As seen in FIG. 13, the first four byte lanes A0, A1, A2, and A3 belong to one 32-bit stream and are hence shuffled by the shuffle buffer system 606 according to the present invention. The four single-byte-wide lanes B, C, D and E are assigned to four independent 8-bit streams and are output unshuffled from the shuffle buffer system. The Butterfly network 608 is also differently configured. The first two stages of multiplexers for the first four byte lanes are frozen in a straight-through configuration. The cross-paths 1044 are shown with dotted lines to indicate that these paths have been disabled. The remaining mux nodes, however, operate normally. The resulting apparatus will produce a sequence of data on the eight output byte lanes (identified in FIG. 13 as lane 1 through lane 8 in the output delay network) as given in the following Table V. Note that the clock cycles neglect the time taken to accumulate 8 bytes into the shuffle buffers, to simplify the table.

TABLE V

| Clock Cycle | Lane #0 | Lane #1 | Lane #2 | Lane #3 | Lane #4 | Lane #5 | Lane #6 | Lane #7 |
|---|---|---|---|---|---|---|---|---|
| 0 | — | — | — | — | — | — | — | — |
| . | . | . | . | . | . | . | . | . |
| . | . | . | . | . | . | . | . | . |
| . | . | . | . | . | . | . | . | . |
| 12 | A00 | A10 | A20 | A30 | A01 | A11 | A21 | A31 |
| 13 | A02 | A12 | A22 | A32 | A03 | A13 | A23 | A33 |
| 14 | A04 | A14 | A24 | A34 | A05 | A15 | A25 | A35 |
| 15 | A06 | A16 | A26 | A36 | A07 | A17 | A27 | A37 |
| 16 | B0 | B1 | B2 | B3 | B4 | B5 | B6 | B7 |
| 17 | C0 | C1 | C2 | C3 | C4 | C5 | C6 | C7 |

TABLE V-continued

| Clock Cycle | Lane #0 | Lane #1 | Lane #2 | Lane #3 | Lane #4 | Lane #5 | Lane #6 | Lane #7 |
|---|---|---|---|---|---|---|---|---|
| 18 | D0 | D1 | D2 | D3 | D4 | D5 | D6 | D7 |
| 19 | E0 | E1 | E2 | E3 | E4 | E5 | E6 | E7 |
| . | . | . | . | . | . | . | . | . |
| . | . | . | . | . | . | . | . | . |
| . | . | . | . | . | . | . | . | . |

In the above table, $A_{xy}$ denotes the $y^{th}$ byte input on byte lane x of the 32-bit data stream; $B_y$, $C_y$, $D_y$, and $E_y$ indicate the $y^{th}$ bytes of the 8-bit data streams, respectively. As can be seen, the output is extended to 64 bits, coherent, aligned and time-multiplexed in the order of the byte lanes. This is the desired purpose of the apparatus with which the present invention is concerned.

Referring back to FIG. 6, it is noted that not all three sub-system units (shuffle buffer 602, permutation network 604, and Butterfly network) are required. Individual units may be omitted according to the following criteria:

If the input streams 112 are all of the same width (e.g., all 8-bit streams, or all 32-bit streams) then the shuffle buffer stage 602 may be omitted. This is because no shuffling of data is required if the data are all of identical width. Of course, the auxiliary functions that may be implemented by the shuffle buffers (i.e., block accumulation and data synchronization) may still be required. In this case, a set of simpler First In First Out (FIFO) buffers can accomplish such processing.

If the input data streams are logically grouped and organized on appropriate boundaries with respect to the signal lines connected to the pipelined Butterfly network, then the permutation network 604 may be omitted. For example, if the input data consists of all 8-bit streams, or all 32-bit streams, then the streams are inherently organized properly and no permutation (or shuffling) is required. If the input comprises a mixture of, say, eight 8-bit streams and two 32-bit streams presented on 128 signal lines, where the 32-bit streams are grouped logically and placed on the first 64 lines (i.e., on 32-bit boundaries), and the 8-bit streams are placed on the next 64 lines, then the shuffle buffers are required to handle the differing data widths. However, no permutation network is needed to properly organize the streams spatially.

The most basic form of this aspect of the invention, therefore, comprises the pipelined Butterfly network. The shuffle buffers 602 are provided if data of different widths must be handled. The permutation network 604 is included if data must be re-organized to bring logically related data streams together on contiguous signal lines.

Figure 14:
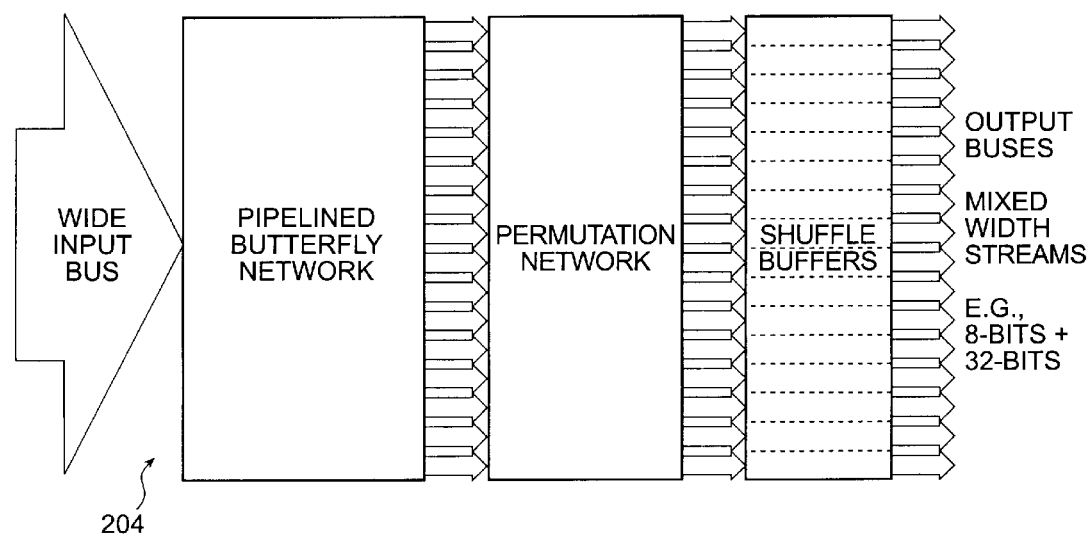
FIG. 14 shows an embodiment of an output merge network according to the invention.

Referring now to FIGS. 1, 12, and 14, a simple reversal and mirroring of the blocks 602, 604, 606 comprising the input merge network 202 is sufficient to realize the output merge network 204. The output merge network accepts a time-division-multiplexed stream of input data words on a wide input bus; the input stream must be regular and repeating in the same format as the output of a similar merging network. The apparatus then follows a reverse procedure to take each input data word, which belongs to a different output stream of some arbitrary (and different) width, and serialize the data word onto the appropriate physical signal wires assigned to that output stream at the output of the apparatus. The pipelined Butterfly network in this case is a mirror image of the network used in the merge system, as are the permutation network and shuffle buffers. No further discussion of this aspect of the invention is needed, since it should be readily understood by one of ordinary skill in the relevant arts who has read and understood the foregoing illustrative embodiments.

FIFO Operation

The functioning of the apparatus as shown in FIGS. 2 and 6 is quite simple. Data are input on the various configured input streams 112 and processed by the input merge network 202. The data are written to the shuffle buffer 602, and then read out in accordance with a specific process (described later) and presented to the permutation network 604. The permutation network then rearranges the streams prior to inputting the data to the pipelined Butterfly network 606. The pipelined Butterfly network, finally, concatenates data from each input stream separately into wider data words (of constant width, regardless of the width of the input stream) and then merges the words for different streams on to the single internal TDM data bus 203 in a time-division-multiplexed manner to produce a stream of internal data. The time-multiplexing is done in a regular and repetitive pattern such that the association of slots in the time-division-multiplexed data stream with the different input streams 112 is simple and fixed. Consequently, the TDM bus 203 is "coherent." That is to say that each internal data word (internal word) that is output onto the bus in any given clock cycle will contain consecutive data units from a single specific stream. Each time slot holds data belonging to one stream only. Data from different streams will not be mixed into the same word, and data units will not be re-ordered within a given internal datum with respect to their order of presentation at the input.

The input streams 112 may optionally be accompanied by flag signals or other control information that serve to identify the characteristics of the data being input at any given instant in time (e.g., to mark the start and end of packets within the data streams, or to indicate valid information vs. invalid or idle characters). These flag signals are processed concurrently with and in the same manner as the data streams, and appear on the output of the merge network 204 simultaneously with the data.

If such optional flag signals are present, the input merge network 202 performs the same concatenation and merging operation on the flags (in synchronism with the data) and outputs them as well. The time-division-multiplexed sequence is fed to the optional tag generator unit 212, which processes the flags to create encoded tags, one tag per time-division slot.

The address generator unit 226 then generates the required sequence of write addresses to write the time-division-multiplexed sequence into the proper logical FIFOs 104 within the data and tag RAMs 222, 224. After writing a word into a given logical FIFO, the tail pointer associated with that FIFO is incremented. The address generator also computes and outputs FIFO flag signals that indicate the state of each logical FIFO.

On the output side, the reverse process takes place. When available (and enabled), data words are read out of the selected logical FIFO(s) in a fixed sequence. The specific data words to read are indicated by logical FIFO head pointers maintained within the address generator unit 226. The address generator unit updates these head pointers and the status flags after each data word has been read. The time-division-multiplexed sequence of internal data words and optional tag words thus produced is placed on the input to the optional tag decoder unit 214. If implemented, the tag decoder converts encoded tags to per-character flags that are associated with the data words. The result is passed to the output merge network 204. Each wide internal data word read from the FIFO is split and serialized into one of the narrower output data streams.

The output merge network then steers the serial stream of data onto the appropriate physical signals. The serialization and data steering process is performed in exactly the reverse order as the concatenation and data merging process within the input merge network. However, as the widths of the data streams supported by the input merge network 202 and the output merge network 204 can be configured separately, data that enter the FIFO system formatted to one width may emerge from the FIFO system formatted to a completely different width. Bandwidth differences resulting thereby are handled in the usual manner (e.g., by using the logical FIFO flags to throttle the input data stream).

It should be noted that the merge logic on either the input datapath or the output datapath (but not both) may be omitted as circumstances require. If a FIFO is desired that merges multiple input data streams into a single RAM, but then produces only a single wide data stream at the output side, then the output datapath (i.e., tag decoder 214 and output merge network 204) may be omitted. This is the case, for example, when creating a FIFO that interfaces between multiple receive link interfaces at various speeds and a single high-speed system bus interface. Alternatively, a FIFO may be constructed by omitting the input datapath (i.e., the input merge network 202 and tag generator 312), leaving only the output datapath. Such a FIFO would typically be used in interfacing between a single high-speed system bus interface and multiple lower-speed transmit link interfaces.

In practice, there is a fixed mapping between a particular logical FIFO constructed within the data RAM and a particular physical output stream (114 in FIG. 2). When some external control entity (not shown or discussed in the context of the invention) decides to transfer data to a particular transmit link interface, it would cause the associated logical FIFO to be read, which in turn would automatically present data to the selected link interface by means of the output merge network. The read from the logical FIFO would be performed in the timeslot of the TDM bus 207 corresponding to the physical output stream 114.

The disclosed input merge network according to the present invention allows the assignment of physical input signals to data streams to be arbitrarily configured, and also allows this assignment to be changed dynamically during operation by simple reconfiguration means. Likewise with the output merge network 204, the width and location of the output streams may be dynamically re-configured without disrupting the data flowing through the system. This is a particularly useful feature of the flexible FIFO system that is difficult to achieve using known techniques and thus represents a significant advance over the prior art.

The foregoing disclosure sets forth embodiments of the invention which meet the desired goals for a useful FIFO mechanism. The flexible multi-stream FIFO mechanism is an advance over prior art FIFOs in the following respects:

The present invention utilizes a single block of RAM, thus allowing the highest efficiency of utilization as well as implementation, while at the same time supporting an arbitrary number of (logical) FIFO buffers. The buffers can be created within this block of RAM by simple configuration means.

The RAM addressing mechanism is simple and regular, and requires only simple control means, even when supporting many different input and output datapath combinations. By comparison, for example, the mechanisms used for RAM control in multidimensional memories have heretofore been quite complex, as exemplified by the addressing mechanism of U.S. Pat. No. 3,800,289.

The FIFO mechanism accommodates input data streams which are not limited to be of equal data widths, but rather may be of different number of bits in width. The output data stream can be some arbitrary number of output data streams, also possibly of different number of bits in width. In an embodiment of the present invention, the various widths of the input and output data streams are restricted to power-of-2 multiples of each other. For example, a combination of output data streams of 16, 64 and 128 bits in width and input data streams that are 8, 16, 32, and 128 bits wide will meet this restriction. The data stream widths are configurable by simple means. Since modern computing is based on the binary system, it is natural to implement the present in invention with data widths using power-of-2 factors. However, it is noted that it is not an essential aspect of the invention that data widths be power-of-2 multiples.

The FIFO system of the present invention is not limited to fixed assignment of input data streams to output data streams. Thus, data that are written into a given logical FIFO buffer via a given input data stream (of specific width) may be read out via any arbitrary output data stream (of different width).

The physical assignment of signal lines to channels—i.e., narrow streams—is arbitrarily modifiable within the power-of-2 constraints of one embodiment of the invention. For example, narrow streams may be distributed in some arbitrary fashion across a set of 128 input signal lines. Thus there may be one 8-bit stream assigned to the first 8 lines, two 32-bit streams assigned to the next 64 lines, three 8-bit streams assigned to the next 32 lines, and one 32-bit stream assigned to the remaining 32 lines.

This invention has been explained with reference to specific illustrative embodiments. Although specific embodiments of the invention have been described, various modifications, alterations, alternative constructions, and equivalents are also encompassed within the scope of the invention. The described invention is not restricted to operation within certain specific data processing environments, but is free to operate within a plurality of data processing environments. Although the present invention has been described in terms of specific embodiments, it should be apparent to those skilled in the art that the scope of the present invention is not limited to the described specific embodiments.

Further, while the present invention has been described using a particular combination of hardware, it should be recognized that alternative combinations of hardware, software, and/or firmware are also within the scope of the present invention. The specification and drawings are, accordingly, to be regarded in an illustrative rather than a restrictive sense. It will, however, be evident that additions, subtractions, substitutions, and other modifications may be made without departing from the broader spirit and scope of the invention as set forth in the claims.

What is claimed is:

1. A method for storing and accessing data in a first-in first-out (FIFO) buffer comprising:
   receiving a first stream of incoming data at an input of the FIFO buffer;
   producing a single stream of internal data, each internal datum comprising two or more data contained in said stream of incoming data;
   storing said internal data in a single-address-space memory store;
   accessing said single-address-space memory store to produce accessed internal data;
   producing outgoing data from said accessed internal data, each outgoing datum comprising data contained in said first stream of incoming data; and
   outputting said outgoing data on two or more output ports, including for each of said accessed internal data serializing said one or more data contained therein to produce serialized data and outputting said serialized data onto one of said one or two or more output ports, wherein said incoming data can be output on said two or more output ports.

2. The method of claim 1 wherein said storing includes generating addresses, each address being generated concurrently with production of an internal datum.

3. The method of claim 1 wherein a data width of said incoming data is different from a data width of said outgoing data.

4. The method of claim 1 wherein said internal data are stored in said single-address-space memory store in FIFO (first-in-first-out) fashion.

5. The method of claim 1 wherein said producing outgoing data includes combining data contained in two or more of said accessed internal data.

6. The method of claim 1 wherein said producing outgoing data includes outputting only some of the data contained in each accessed internal datum over one of said output ports.

7. A method for storing and accessing data comprising:
   receiving a plurality of incoming data streams;
   delaying an ith input stream by (n−1) units of time for every value of i from 1 to N, where N is the number of said incoming data streams, to produce delayed input data streams;
   producing a single stream of internal data, said stream of internal data comprising plural data lanes, said producing including shifting corresponding data in each of said delayed input data streams to one of said data lanes so that each said data lane comprises a stream of corresponding data from each of said internal data streams;
   storing said internal data in a first memory store;
   accessing said first memory store to produce one or more accessed internal data; and
   producing an outgoing data stream of outgoing data.

8. The method of claim 7 wherein each outgoing datum comprises data contained in one or more of said accessed internal data.

9. The method of claim 7 wherein those of said internal data which are produced from the same incoming data stream are stored in FIFO (first-in-first-out) fashion.

10. The method of claim 7 wherein said first memory store is addressed by a single address space.

11. The method of claim 7 further including detecting flag information contained in said incoming data streams and in response thereto producing a stream of tags, each tag corresponding to one of said internal data.

12. The method of claim 11 wherein said tags are stored in said first memory store.

13. The method of claim 11 wherein said tags are stored in a second memory store.

14. The method of claim 13 wherein said first and said second memory stores are addressed in the same address space.

15. The method of claim 7 wherein each of said internal words has a width that is an integral multiple of the smallest data width of said incoming data streams.

16. The method of claim 7 wherein each of said internal words has a width that is a power-of-two multiple of the smallest data width of said incoming data streams.

17. A method for buffering data in a data buffer comprising:
   providing a first memory store having a single address space associated therewith;
   receiving a plurality of data streams at a plurality of input ports of said data buffer, each data stream having a data width;
   merging said data streams to produce a single stream of internal words, including combining one or more data from a data stream to produce an internal word, each of said internal words having a first data width being at least as wide as the widest of said data streams; and
   storing all of said internal words in said first memory store,
   said merging including shifting corresponding data in each of said data streams to a form one or more internal data lanes, each internal word comprising data from each of said data lanes,
   wherein each of said internal words has a width that is an integral multiple of the smallest data width of said incoming data streams.

18. The method of claim 17 wherein said storing includes producing an address at a rate equal to production of said internal words.

19. The method of claim 17 wherein those of said internal words that are produced from the same data stream are stored in FIFO (first-in-first-out) order.

20. The method of claim 17 further including detecting flag information contained in said data streams and in response thereto producing a stream of tags, each tag corresponding to one of said internal data.

21. The method of claim 20 further including storing said tags in said first memory store.

22. The method of claim 20 further including storing said tags in a second memory store.

23. The method of claim 22 wherein said first and said second memory stores are addressed in the same address space.

24. The method of claim 17 wherein each of said internal words has a width that is a power-of-two multiple of the smallest data width of said incoming data streams.

25. A data buffer comprising:
   a first input port for receiving first incoming data;
   at least a second input port for receiving second incoming data;
   an input unit operative to produce a single stream of internal data comprising a first plurality of internal data and a second plurality of internal data, said first plurality of internal data comprising said first incoming data, said second plurality of internal data comprising said second incoming data;

a memory store coupled to receive said single stream of internal data for storage therein;

an output unit coupled to said memory store, said output unit operative to produce first outgoing data comprising said first plurality of internal data read from said memory store, said output unit operative to produce second outgoing data comprising second internal data read from said memory store;

a first output port for outputting said first outgoing data;

a second output port for outputting said second outgoing data; and an address generation unit operatively coupled to said memory store to store and retrieve said internal data, said input unit and said address generation unit being synchronized to a plurality of time slots, said input unit configured to produce an internal datum during each said time slots, said address generation unit configured to produce a write address and a read address during each of said time slots.

26. The data buffer of claim 25, wherein said address generation unit produces addresses belonging to a single address space.

27. The data buffer of claim 25 wherein said address generation unit is configured to: (i) store and access said internal data in first-in-first-out (FIFO) fashion; (ii) store and access said first internal data in a first FIFO data structure; and (iii) store and access said second internal data in a second FIFO data structure.

28. The data buffer of claim 25 wherein said first incoming data have a data width that is an integral multiple of a data width of said second incoming data.

29. The data buffer of claim 28 wherein said integral multiple is a power of two.

30. The data buffer of claim 25 wherein said input unit is further operative to produce a plurality of tags based on flag information contained in said incoming data, each tag corresponding to one of said internal data.

31. The data buffer of claim 30 further including a second memory store coupled to receive said tags.

32. The data buffer of claim 30 wherein said tags are stored in and accessed from said memory store.

33. A data buffer comprising:

a plurality of data inputs, each data input for receiving a plurality of incoming data;

input logic coupled to said data inputs and configured to produce a single stream of internal words from said incoming data, each internal word associated with one of said data inputs and comprising one or more of said incoming data received therefrom;

a memory store coupled to said input logic to store said internal words;

an address generator coupled to said memory store, said address generator effective for producing an address from a single address space;

output logic coupled to said memory store and configured to access said memory store to produce a plurality of accessed internal words and to produce a plurality of outgoing data therefrom.

34. The data buffer of claim 33 further including an input sequence controller and an output sequence controller operative with said address generator to address said memory store such that each of said data inputs has an associated first-in-first-out (FIFO) data structure and internal words associated with a data input are stored in its associated FIFO.

35. The data buffer of claim 33 wherein said input logic is further configured to identify flag information contained in said incoming data and to produce a plurality of tags therefrom, each of said tags corresponding to one of said internal words.

36. The data buffer of claim 35 further including a second memory store coupled to receive said tags.

37. A data buffer comprising:

an input port for receiving a data stream of input data from an input of said data buffer;

a memory coupled to receive said input data to be stored as internal data, each internal datum comprising some of said input data; and an output unit coupled to receive data from said memory store, said output unit having a first output port and a second output port, said output unit configured to produce first outgoing data for said first output port and second outgoing data for said second output port, said first outgoing data comprising one or more data from said input data, said second outgoing data comprising one or more data from said input data, wherein said input data can be output on said first and second output ports.

38. The data buffer of claim 37 wherein internal data are of equal width.

39. The data buffer of claim 37 wherein said memory store is addressed by a single address space.

40. The data buffer of claim 37 wherein said first output data has a data width different from that of said second output data.

41. The data buffer of claim 42 wherein data widths of said first output data and said second output data are different from that of said input data.

42. The data buffer of claim 37 wherein said memory store is accessed in first-in-first-out manner.

* * * * *